(12) United States Patent
Soga

(10) Patent No.: US 10,652,409 B2
(45) Date of Patent: May 12, 2020

(54) APPARATUS FOR SETTING INFORMATION RELATING TO SCANNED IMAGE, METHOD AND STORAGE MEDIUM

(71) Applicant: CANON KABUSHIKI KAISHA, Tokyo (JP)

(72) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/241,697

(22) Filed: Jan. 7, 2019

(65) Prior Publication Data

US 2019/0230232 A1   Jul. 25, 2019

(30) Foreign Application Priority Data

Jan. 23, 2018   (JP) .................. 2018-008956

(51) Int. Cl.
*H04N 1/00* (2006.01)
*G06K 9/00* (2006.01)
(Continued)

(52) U.S. Cl.
CPC ....... *H04N 1/00331* (2013.01); *G06F 40/109* (2020.01); *G06K 9/00456* (2013.01); *G06K 9/00463* (2013.01); *H04N 1/0044* (2013.01); *H04N 1/0049* (2013.01); *G06K 2209/01* (2013.01)

(58) Field of Classification Search
CPC .................. G06F 3/0485; G06F 17/211; G06F 2203/04806; G06F 3/0483; G06F 3/0488; G06F 16/51; G06F 17/212; G06F 3/041; G06F 3/04883; G06F 9/451; G06F 16/164; G06T 11/60; G06T 3/40; G06T 7/60; G06T 3/20; G06K 9/00456; G06K 9/00463; G06K 2209/01; G06K 9/344; G02B 21/365; H04N 1/00225; H04N 2201/0094
USPC ................ 58/1.9; 358/1.15, 2.1, 1.14, 1.16; 709/224
See application file for complete search history.

(56) References Cited

U.S. PATENT DOCUMENTS

2009/0204589 A1* 8/2009 Soga ..................... G06F 16/93
2011/0242568 A1* 10/2011 Soga ..................... G06F 3/1204
358/1.13

(Continued)

FOREIGN PATENT DOCUMENTS

JP   S62-051866   3/1987
JP   2005-267395   9/2005

*Primary Examiner* — Negussie Worku
(74) *Attorney, Agent, or Firm* — Venable LLP

(57) ABSTRACT

The apparatus according to the present invention includes: a display control unit configured to display scanned image represented by scanned image data on a preview screen; a generation unit configured to generate information relating to the scanned image data by using the character string of the character string area selected via the preview screen; and a holding unit configured to hold selection information capable of specifying the selected character string area, and the display control unit determines a target that is displayed in a selected state of the character string areas extracted by the extraction unit based on the selection information relating to past scanned image data, which is held by the holding unit, and determines a display range of the scanned image so that all the target character string areas are included within the preview screen.

19 Claims, 22 Drawing Sheets

(51) Int. Cl.
  *G06F 40/109*  (2020.01)
  *G06F 17/21*  (2006.01)

(56) References Cited

U.S. PATENT DOCUMENTS

| | | | |
|---|---|---|---|
| 2012/0140275 A1* | 6/2012 | Fukuda | H04N 1/3871 358/1.15 |
| 2013/0046827 A1* | 2/2013 | Soga | H04L 51/24 709/204 |
| 2013/0050730 A1* | 2/2013 | Soga | H04N 1/2166 358/1.13 |
| 2014/0304345 A1* | 10/2014 | Soga | H04L 51/32 709/206 |
| 2015/0032693 A1* | 1/2015 | Soga | G06F 16/93 707/624 |
| 2015/0347069 A1* | 12/2015 | Soga | G06F 3/1243 358/1.6 |
| 2015/0373224 A1* | 12/2015 | Kusakabe | H04N 1/32096 358/1.15 |
| 2016/0072968 A1* | 3/2016 | Nakamura | H04N 1/00241 358/1.15 |
| 2017/0257520 A1* | 9/2017 | Miura | H04N 1/3876 |
| 2017/0357412 A1* | 12/2017 | Shiode | G06F 16/242 |
| 2018/0218206 A1* | 8/2018 | Kamata | G06K 9/00449 |
| 2018/0285069 A1* | 10/2018 | Matsuo | G10L 15/26 |
| 2019/0065842 A1* | 2/2019 | Soga | G06K 9/00469 |
| 2019/0065843 A1* | 2/2019 | Matsumoto | G06K 9/6878 |
| 2019/0089849 A1* | 3/2019 | Yamazaki | H04N 1/00331 |
| 2019/0102385 A1* | 4/2019 | Tokita | G06F 16/164 |
| 2019/0141203 A1* | 5/2019 | Morita | H04N 1/2166 |
| 2019/0244020 A1* | 8/2019 | Yoshino | H04N 1/00803 |
| 2019/0303701 A1* | 10/2019 | Kazume | G06F 16/164 |
| 2019/0362143 A1* | 11/2019 | Nakamura | G06K 9/00449 |

\* cited by examiner

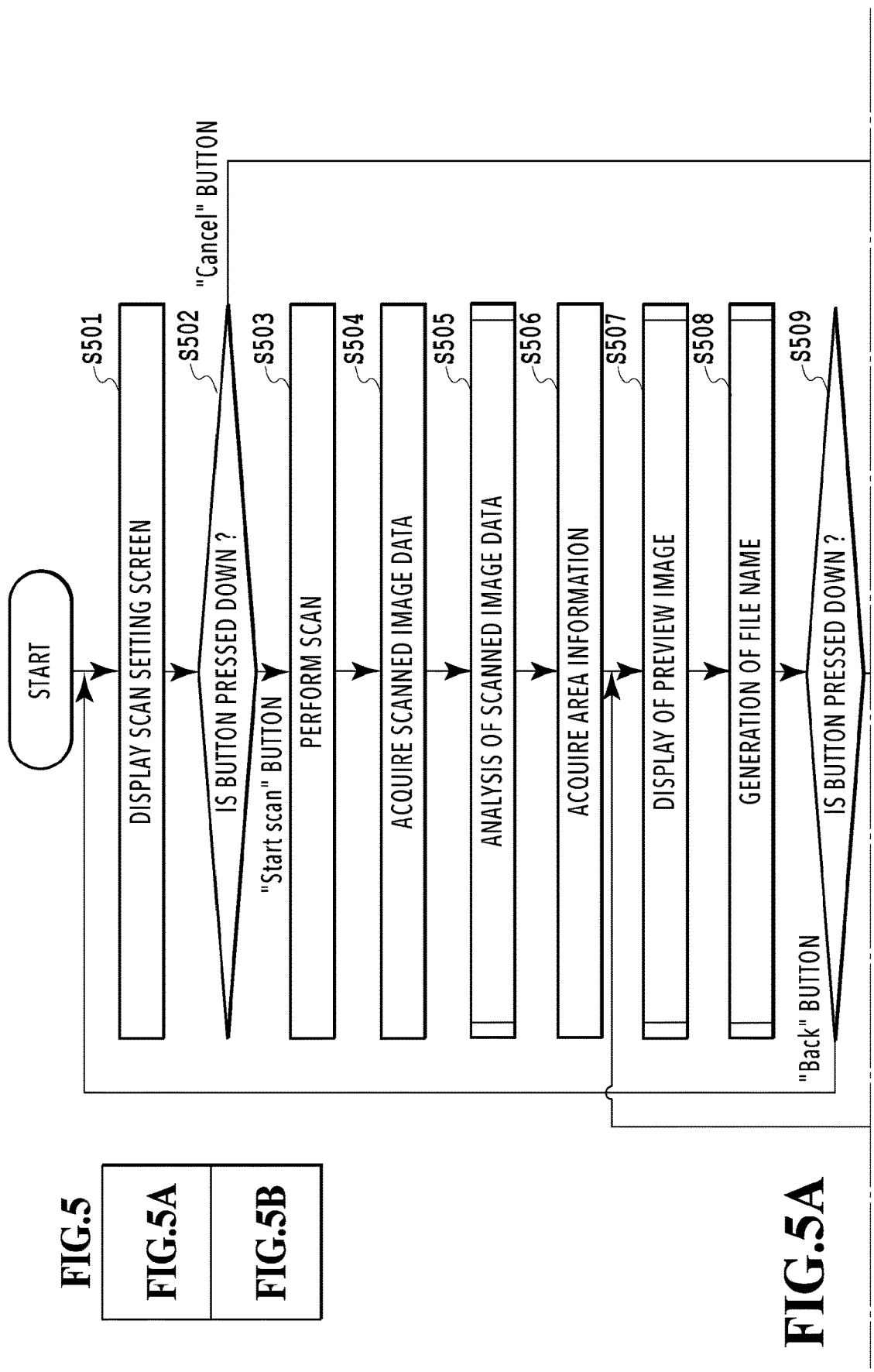

FIG. 10A

Preview Screen

Quotation

Postal code 100-9999
1-1-1 Minato-ku, Tokyo
Shinagawa Inc.

Quotation No.: R12-3456
Date of issue: 2017/09/10

| Item | Unit price | Quantity | Amount |
|------|-----------|----------|--------|

Back | Next

PreviewScreen — 1000

1001: Quotation_R12_3456_Kawasaki Inc.

1002: ⚙

1011: ←
1013: +
1014: −
1012: →

1010:

| Item | Unit price | Quantity | Amount |
|---|---|---|---|
| GF-1544 | 11,550 | 3 | 34,650 |
| EF24-70 | 134,100 | 1 | 134,100 |
| | | Total | 168,750 |

1025: Postal code 200-1111
1026: 2-2-2 Yokohama-shi, Kanagawa
1027: Kawasaki Inc.

1030: Back
1031: Next

FIG.14B

Preview Screen — 1400

Quotation_R12_3457_Kawasaki Inc. — 1401

1410

Quotation — 1411

Quotation No.: R12-3457 — 1412
Date of issue: 2017/09/17

Postal code 100-9999
1-1-1 Minato-ku, Tokyo
Shinagawa Inc.

| Item | Unit price | Quantity | Amount |
|---|---|---|---|
| GF-1544 | 11,550 | 3 | 34,650 |
| EF24-70 | 134,100 | 1 | 134,100 |
| | | Total | 168,750 |

1413

Postal code 200-1111
2-2-2 Yokohama-shi, Kanagawa
Kawasaki Inc. — 1414
PQR office — 1415

Back — 1430    Next — 1431

FIG. 15B

Preview Screen — 1400

Quotation_R12_3457_Kawasaki Inc. — 1401

1410

Quotation — 1411

Quotation No.: R12-3457 — 1412

Date of issue: 2017/09/17

Postal code 100-9999
1-1 Minato-ku, Tokyo
Shinagawa Inc.

Postal code 200-1111
2-2-2 Yokohama-shi, Kanagawa
Kawasaki Inc.

1417

1416

Kawasaki Inc. — 1430

Back

Next — 1431

Quotation

Quotation No.:
R12-3456

Postal code 100-9999
1-1-1 Minato-ku, Tokyo

Date of issue:
2017/09/10

Shinagawa Inc.

| Item | Unit price | Quantity | Amount |
|---|---|---|---|
| GF-1544 | 11,550 | 3 | 34,650 |
| EF24-70 | 134,100 | 1 | 134,100 |
| | | Total | 168,750 |

Postal code 200-1111
2-2-2 Yokohama-shi, Kanagawa
Kawasaki Inc.

TEL : 045-567-8901
FAX : 045-567-8902

Remarks

Quotation

Quotation No.:
R12-3457

Postal code 100-9999
1-1-1 Minato-ku, Tokyo

Date of issue:
2017/09/17

Shinagawa Inc.

| Item | Unit price | Quantity | Amount |
|---|---|---|---|
| GF-1544 | 11,550 | 3 | 34,650 |
| EF24-70 | 134,100 | 1 | 134,100 |
| | | Total | 168,750 |

Postal code 200-1111
2-2-2 Yokohama-shi, Kanagawa
Kawasaki Inc.

TEL : 045-567-8901
FAX : 045-567-8902

Remarks

FIG.17

APPARATUS FOR SETTING INFORMATION RELATING TO SCANNED IMAGE, METHOD AND STORAGE MEDIUM

BACKGROUND OF THE INVENTION

Field of the Invention

The present invention relates to a technique to set information relating to a scanned image obtained by performing a scan.

Description of the Related Art

Conventionally, a technique has been proposed that performs character recognition processing (OCR processing) for an image obtained by scanning a paper document (hereinafter, a scanned image) and generates a file name of the scanned image by using recognized characters (see Japanese Patent Laid-Open No. S62-051866(1987)). Further, a technique has been proposed that causes a user to select an area that is a target of OCR processing (OCR area) via a preview screen by displaying a scanned image on the preview screen (see Japanese Patent Laid-Open No. 2005-267395). In recent years, by applying these techniques, a user is caused to select characters used for generation of a file name of a scanned image.

In view of that areas that were selected as an OCR area in the past are likely to be reselected, the present applicants have been discussing to display those areas in advance in a selected state (highlighted display and the like) on the preview screen. However, in a case where each of the OCR areas selected in the past is interspersed across a wide range of the scanned image (for example, in a case where the OCR targets are the area at the upper portion and the area at the lower portion of the scanned image), on a condition that the display mode of the scanned image is changed (for example, the display is automatically enlarged so that it is possible to check the contents of the description of the characters), there is a possibility that one of the OCR areas is no longer included within the preview screen. In such a case, it becomes hard for a user to check which characters within a paper document are used for a file name. Further, in order to check the image of a character string that is used for generation of a file name and which exists outside the screen in a case where the image is enlarged and displayed, it becomes necessary to perform a screen operation (for example, a reduction operation), and therefore, this causes time and effort of a user.

In view of the above-described problem, an object of the present invention is to present a character string used for generation of a file name or the like in a mode in which it is easy for a user to check the character string in a scene in which a file name or the like is generated by using a character string obtained by performing OCR processing for a scanned image.

SUMMARY OF THE INVENTION

The apparatus according to the present invention includes: an extraction unit configured to extract a character string area that is estimated and recognized as a character string from a scanned image represented by scanned image data obtained by scanning a document; a display control unit configured to display the scanned image on a preview screen so that a user can select the character string area extracted by the extraction unit; a generation unit configured to generate information relating to the scanned image data by using the character string of the character string area selected by a user via the preview screen; and a holding unit configured to hold selection information capable of specifying the character string area selected by the user, and the display control unit determines a target that is displayed in a selected state of the character string areas extracted by the extraction unit based on the selection information relating to past scanned image data, which is held by the holding unit, and determines a display range of the scanned image so that all the target character string areas are included within the preview screen.

Further features of the present invention will become apparent from the following description of exemplary embodiments with reference to the attached drawings.

BRIEF DESCRIPTION OF THE DRAWINGS

FIG. 5 is a diagram showing the relationship of FIG. 5A and FIG. 5B;

FIG. 5A is a flowchart showing an operation to transfer image data of a document scanned by the MFP to the file server;

FIG. 10A to FIG. 10C are each a diagram showing an example of a preview screen;

FIG. 14A and FIG. 14B are each a diagram showing an example of a preview screen;

FIG. 15A and FIG. 15B are each a diagram showing an example of a preview screen;

FIG. 16 is a diagram showing an example of a scan-target business form; and

FIG. 17 is a diagram showing an example of a scan-target business form.

DESCRIPTION OF THE EMBODIMENTS

In the following, embodiments for embodying the present invention are explained by using the drawings. The following embodiments are not intended to limit the invention according to the scope of the claims and all combinations of features explained in the following embodiments are not necessarily indispensable to the solution of the invention.

[First Embodiment]

<Configuration of Image Processing System>

Figure 1:
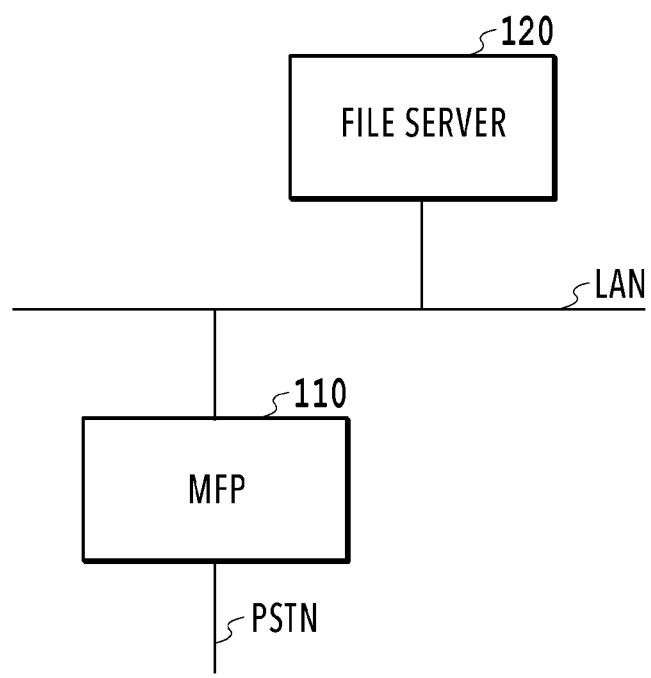
FIG. 1 is a block diagram showing an example of an entire configuration of an image processing system according to a first embodiment.

FIG. 1 is a block diagram showing an example of an entire configuration of an image processing system according to a first embodiment. The image processing system includes an MFP 110 and a file server 120. The MFP 110 and the file server 120 are connected to each other so as to be capable of communication via a LAN (Local Area Network).

The MFP (Multi Function Peripheral) 110 is a multi function peripheral having a plurality of functions, such as a function as a scanner and a function as a printer, and is an example of an image processing apparatus. The file server 120 is an example of an external server that saves and manages a document file turned into electronic data. The image processing system of the present embodiment has a configuration including the MFP 110 and the file server 120, but the configuration is not limited to this. For example, it may also be possible for the MFP 110 to play a role as the file server 120. Further, for example, it may also be possible for the MFP 110 and the file server 120 to be connected to each other via the internet or the like in place of the LAN. Furthermore, it is possible for the MFP 110 to perform facsimile communication of image data with a facsimile device (not shown schematically) via PSTN (Public Switched Telephone Networks).

Figure 2:
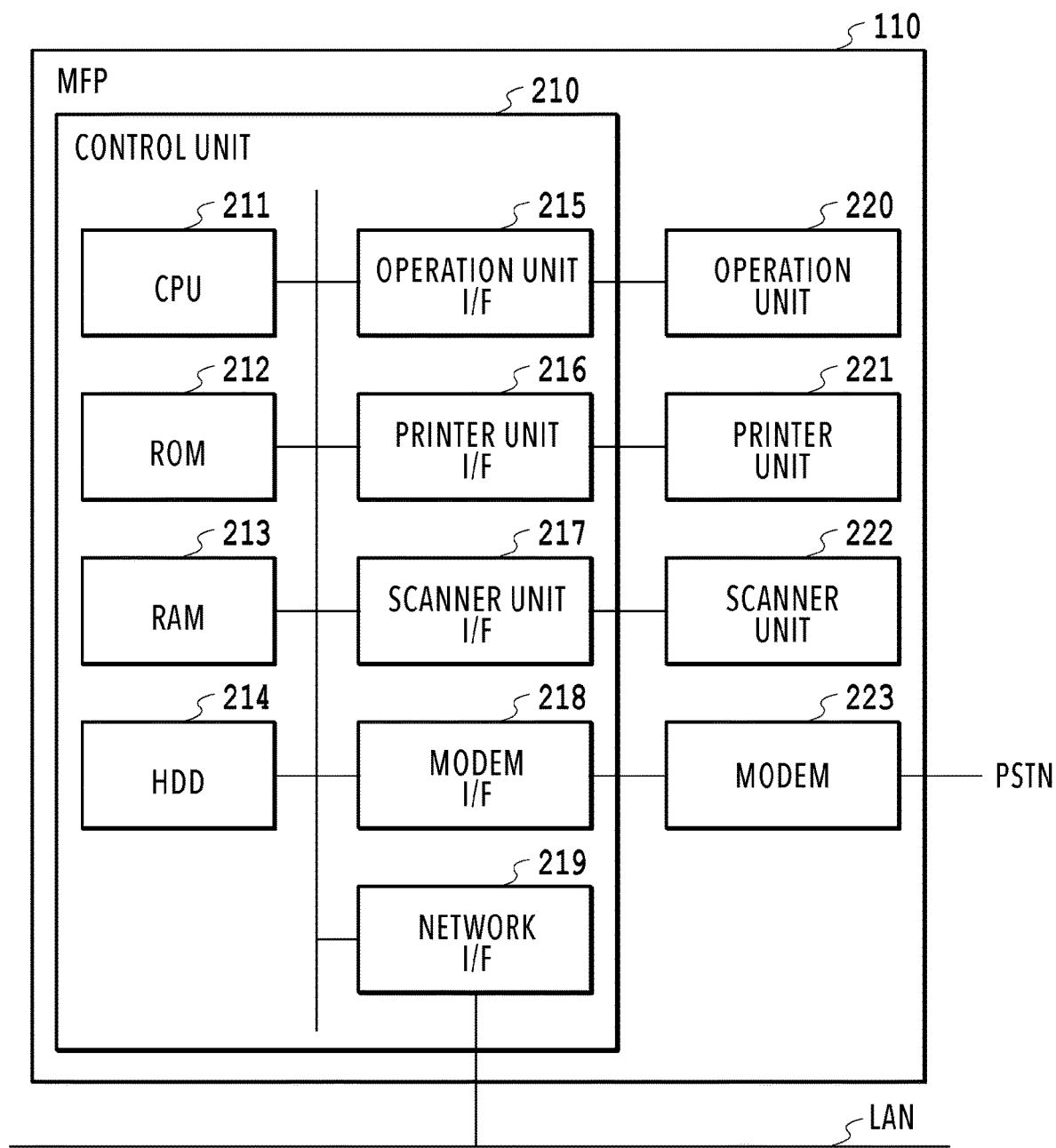
FIG. 2 is a block diagram showing an example of a hardware configuration of an MFP.

FIG. 2 is a block diagram showing an example of a hardware configuration of the MFP 110. The MFP 110 has a control unit 210, an operation unit 220, a printer unit 221, a scanner unit 222, and a modem 223. The control unit 210 has a CPU 211, a ROM 212, a RAM 213, an HDD 214, an operation unit I/F 215, a modem I/F 218, and a network I/F 219 and controls the operation of the entire MFP 110.

The CPU 211 reads control programs stored in the ROM 212 and performs various functions possessed by the MFP 110, such as the scan function, the print function, and the communication function, and at the same time, controls those various functions. The RAM 213 is used as a temporary storage area, such as a main memory and a work area, of the CPU 211. In the present embodiment, the one CPU 211 performs each piece of processing shown in a flowchart, to be described later, by using one memory (RAM 213 or HDD 21), but this is not limited. For example, it may also be possible to cause a plurality of CPUs and a plurality of RAMs or HDDs to perform each piece of processing in cooperation. The HDD 214 is a hard disk drive that stores image data and various programs. The operation unit I/F 215 is an interface that connects the operation unit 220 and the control unit 210. The operation unit 220 includes a touch panel, a keyboard and so on, and receives an operation, an input, instructions and so on by a user. A printer unit I/F 216 is an interface that connects the printer unit 221 and the control unit 210. Image data for print is transferred from the control unit 210 to the printer unit 221 via the printer unit I/F 216 and printed on a printing medium. A scanner unit I/F 217 is an interface that connects the scanner unit 222 and the control unit 210. The scanner unit 222 reads a document set on a document table or ADF (Auto Document Feeder), not shown schematically, and generates image data and inputs the image data to the control unit 210 via the scanner unit I/F 217. It is possible for the MFP 110 to perform file transmission or mail transmission as well as to print image data generated by the scanner unit 222 from the printer unit 221. The modem I/F 218 is an interface that connects the modem 223 and the control unit 210. The modem 223 performs facsimile communication of image data with a facsimile device on the PSTN. The network I/F 219 is an interface that connects the control unit 210 (MFP 110) to the LAN. The MFP 110 transmits image data and information to an external device (file server 120 and the like) on the LAN, receives various kinds of information, and so on by using the network I/F 219.

Figure 3:
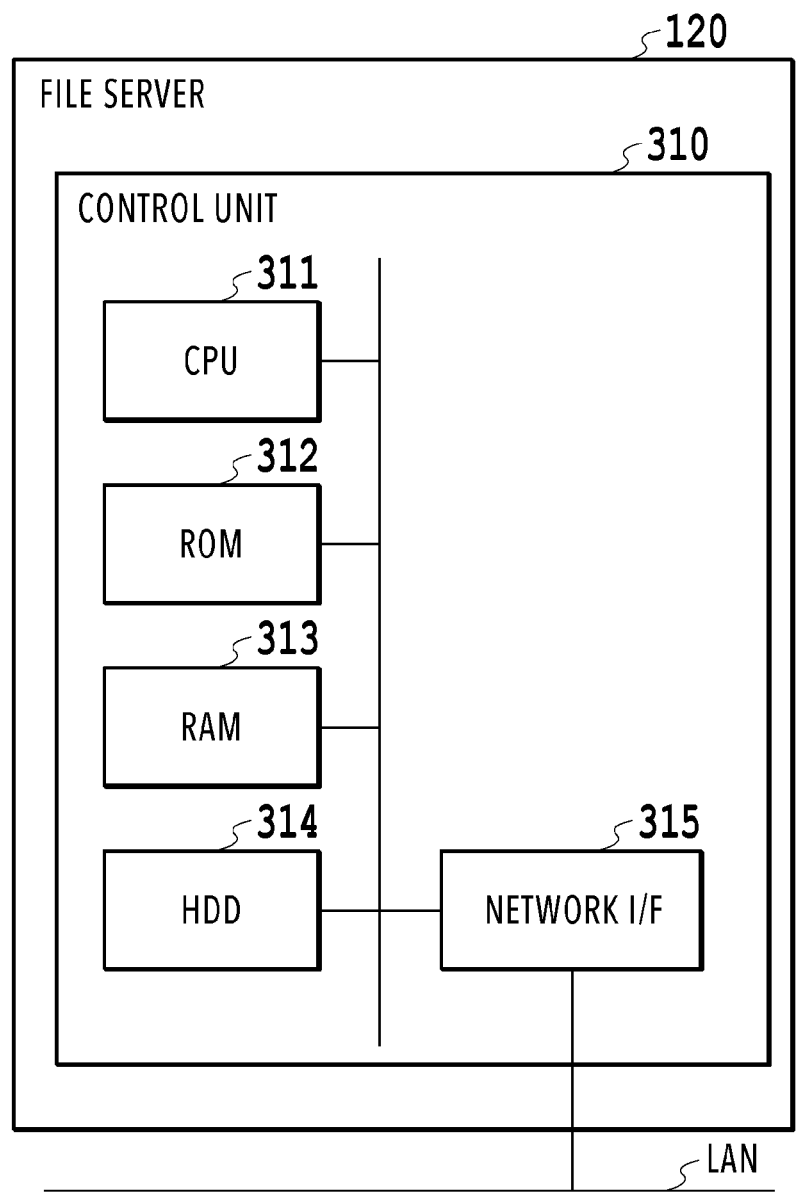
FIG. 3 is a block diagram showing an example of a hardware configuration of a file server.

FIG. 3 is a block diagram showing an example of a hardware configuration of the file server 120. The file server 120 has a CPU 311, a ROM 312, a RAM 313, an HDD 314, and a network I/F 315. The CPU 311 controls the operation of the entire file server 120 by reading control programs stored in the ROM 312 and performing various kinds of processing. The RAM 313 is used as a temporary storage area, such as a main memory and a work area, of the CPU 311. The HDD 314 is a hard disk drive that stores image data and various programs. The network I/F 315 is an interface that connects the file server 120 to a LAN. The file server 120 performs transmission and reception of various kinds of information with another device (MFP 110 and the like) on the LAN by using the network I/F 315.

Figure 4:
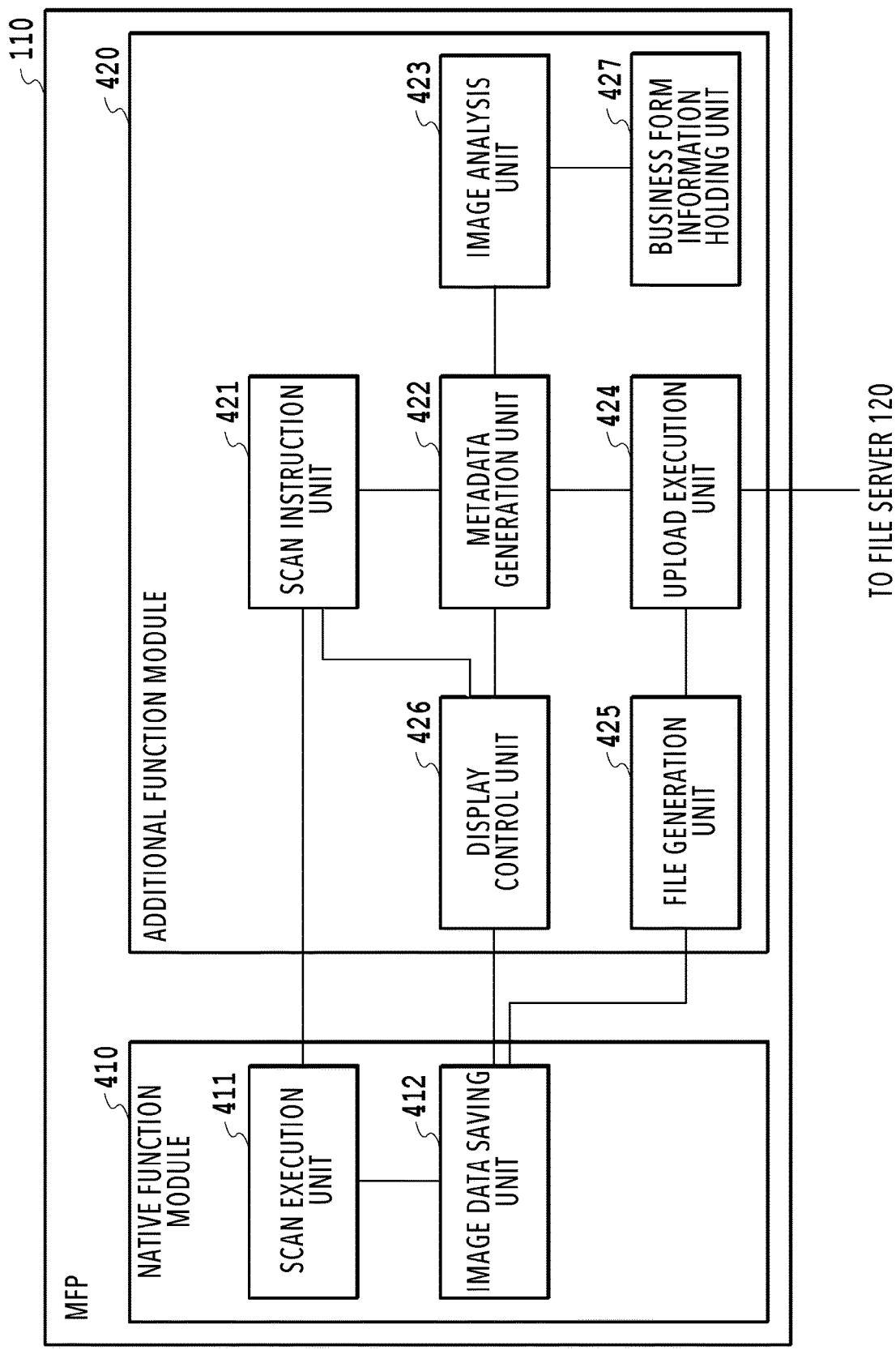
FIG. 4 is a block diagram showing an example of a software configuration of the MFP.

FIG. 4 is a block diagram showing an example of a software configuration of the MFP 110. The MFP 110 has a native function module 410 and an additional function module 420. While each unit included in the native function module 410 is provided for the MFP 110 as a standard unit, each unit of the additional function module 420 is an application additionally installed in the MFP 110. The additional function module 420 is an application based on Java (registered trademark) and it is possible to easily implement addition of a function to the MFP 110. In the MFP 110, another additional function module (additional application), not shown schematically, may be installed.

The native function module 410 has a scan execution unit 411 and an image data saving unit 412. The additional function module 420 has a scan instruction unit 421, a metadata generation unit 422, an image analysis unit 423, an upload execution unit 424, a file generation unit 425, a display control unit 426, and a business form information holding unit 427.

The display control unit 426 displays a UI (user interface) screen for receiving an operation, an input, instructions and so on by a user on a liquid crystal display unit of the operation unit 220 of the MFP 110. Details of the UI screen will be described later. The liquid crystal display unit of the operation unit 220 in the present embodiment has a touch panel function. Consequently, in the following, there is a case where the liquid crystal display unit of the operation unit 220 is represented simply as a touch panel.

The scan instruction unit 421 requests the scan execution unit 411 to perform scan processing as well as requesting information on the scan setting and the transfer setting included in user instructions in accordance with the user instructions input via the display control unit 426.

The scan execution unit 411 receives a scan request including the scan setting from the scan instruction unit 421. The scan execution unit 411 generates scanned image data by reading an image on a document by the scanner unit 222 via the scanner I/F 217. The scan execution unit 411 sends the generated scanned image data to the image data saving unit 412. At this time, the scan execution unit 411 sends a scanned image identifier uniquely indicating the saved scanned image data to the scan instruction unit 421. The image data saving unit 412 saves the scanned image data received from the scan execution unit 411 in the HDD 214.

The scan instruction unit 421 acquires the scanned image data corresponding to the scanned image identifier received from the scan execution unit 411 from the image data saving unit 412. The scan instruction unit 421 requests the metadata generation unit 422 to generate metadata of the acquired scanned image data. At this time, the scan instruction unit 421 delivers the scanned image identifier to the metadata generation unit 422. The metadata is information relating to scanned image data and as an example, there is a file name that is attached to scanned image data. In the following, a case where metadata is a file name is explained as an example.

The metadata generation unit 422 sends instructions to analyze scanned image data to the image analysis unit 423. The image analysis unit 423 performs an image analysis (layout analysis processing and OCR processing (character string recognition processing)) for the scanned image data based on the analysis instructions from the metadata generation unit 422. The image analysis unit 423 sends area information obtained by performing the image analysis for the scanned image data to the metadata generation unit 422 as analysis results. In Table 1, an example of area information is shown. The area information stores a number for identifying an area, an X-coordinate, a Y-coordinate, a width, and a height of an area, and information indicating the kind of area for each area, such as a character area and a table area, included in the scanned image data. Here, the character area is an area estimated and recognized as a character string by the image analysis and the table area is an area estimated and recognized as a table by the image analysis. The method of detecting text and a table from image data is widely known, and therefore, explanation is omitted. Further, in Table 1, for simplification of explanation, only part of areas within the scanned image data are described.

TABLE 1

| No. | X-coordinate of area | Y-coordinate of area | Width of area | Height of are | Kind |
|---|---|---|---|---|---|
| 1 | 191 | 24 | 120 | 30 | text |
| 2 | 324 | 74 | 84 | 22 | text |
| 3 | 377 | 99 | 75 | 22 | text |
| 4 | 15 | 104 | 91 | 22 | text |
| 5 | 324 | 128 | 70 | 22 | text |
| 6 | 15 | 130 | 134 | 22 | text |
| 7 | 362 | 155 | 90 | 22 | text |
| 8 | 37 | 166 | 136 | 30 | text |
| 9 | 37 | 190 | 480 | 120 | table |
| 10 | 214 | 311 | 91 | 22 | text |
| 11 | 214 | 335 | 136 | 22 | text |
| 12 | 236 | 359 | 134 | 30 | text |
| 13 | 413 | 367 | 45 | 22 | text |

The image analysis unit 423 compares the area information obtained by the image analysis of this time with each piece of area information obtained by the previous image analyses (image analyses performed in the past). Each piece of area information obtained by the previous image analyses is held by the business form information holding unit 427. Further, to each piece of area information held by the business form information holding unit 427, selection information capable of specifying the character area selected by a user in the processing at step S508 (generation processing of a file name) is attached. Hereinafter, the information that is the area information to which the selection information is attached is called business form information (or document information). In a case of determining that area information similar to the area information obtained by the image analysis of this time is stored in the business form information holding unit 427 based on the results of the above-described comparison, the image analysis unit 423 further checks whether the selection information is attached to the similar area information. In a case where the selection information is attached to the similar area information, the image analysis unit 423 sends the selection information and a character string obtained by performing OCR processing for the character area specified by the selection information (hereinafter, called a selected character area) to the metadata generation unit 422 by including them in the analysis results of the image analysis. Details of these pieces of processing will be described later by using FIG. 5. The analysis results of the image analysis are also sent to the display control unit 426 via the metadata generation unit 422.

Further, the metadata generation unit 422 generates metadata (in the present embodiment, a file name) based on the user instructions input via the UI screen and the analysis results of the image analysis unit 423. The metadata generation unit 422 sends a scanned image identifier and the generated metadata to the upload execution unit 424. Then, the metadata generation unit 422 instructs the upload execution unit 424 to upload the scanned image data to the file server 120.

Further, the metadata generation unit 422 sends display instructions to the display control unit 426. The display control unit 426 displays a UI screen (for example, FIG. 10A, to be described later) for receiving an operation, an input, and instructions for generating a file name on the touch panel of the operation unit 220 of the MFP 110 based on the display instructions from the metadata generation unit 422. Further, the display control unit 426 displays a preview image of the scanned image data on the UI screen based on the display instructions from the metadata generation unit 422.

The upload execution unit 424 sends instructions to display a UI screen to the display control unit 426. The display control unit 426 displays a UI screen (for example, FIG. 12, to be described later) for receiving a folder path setting and an operation, an input, and instructions of upload. Further, upon receipt of the upload instructions from a user, the upload execution unit 424 instructs the file generation unit 425 to generate a file of the scanned image data indicated by the scanned image identifier in accordance with the instructions.

The file generation unit 425 acquires the scanned image data that is a target for which a file is generated from the image data saving unit 412 and generates a file that is transmitted to the file server 120.

The upload execution unit 424 connects to the file server 120 by using the folder path setting and the file name generated by the metadata generation unit 422 and transmits the file generated by the file generation unit 425. Upon the completion of the upload, the upload execution unit 424 notifies the display control unit 426 of the completion of the upload. Upon receipt of the notification from the upload execution unit 424, the display control unit 426 updates the display contents. The upload execution unit 424 has an SMB (Server Message Block) client function. Due to this, it is possible for the upload execution unit 424 to perform the file and folder operations by using the SMB for the file server 120 having an SMB server function. It is possible to use WebDAV (Distributed Authoring and Versioning protocol for the WWW), in addition to the SMB. Further, it is also possible to use FTP (File Transfer Protocol), SMTP (Simple Mail Transfer Protocol), and so on. Furthermore, it is also possible to use SOAP, REST (Representational State Transfer), and so on for purposes other than file transmission, in addition to the above.

Figure 5B:
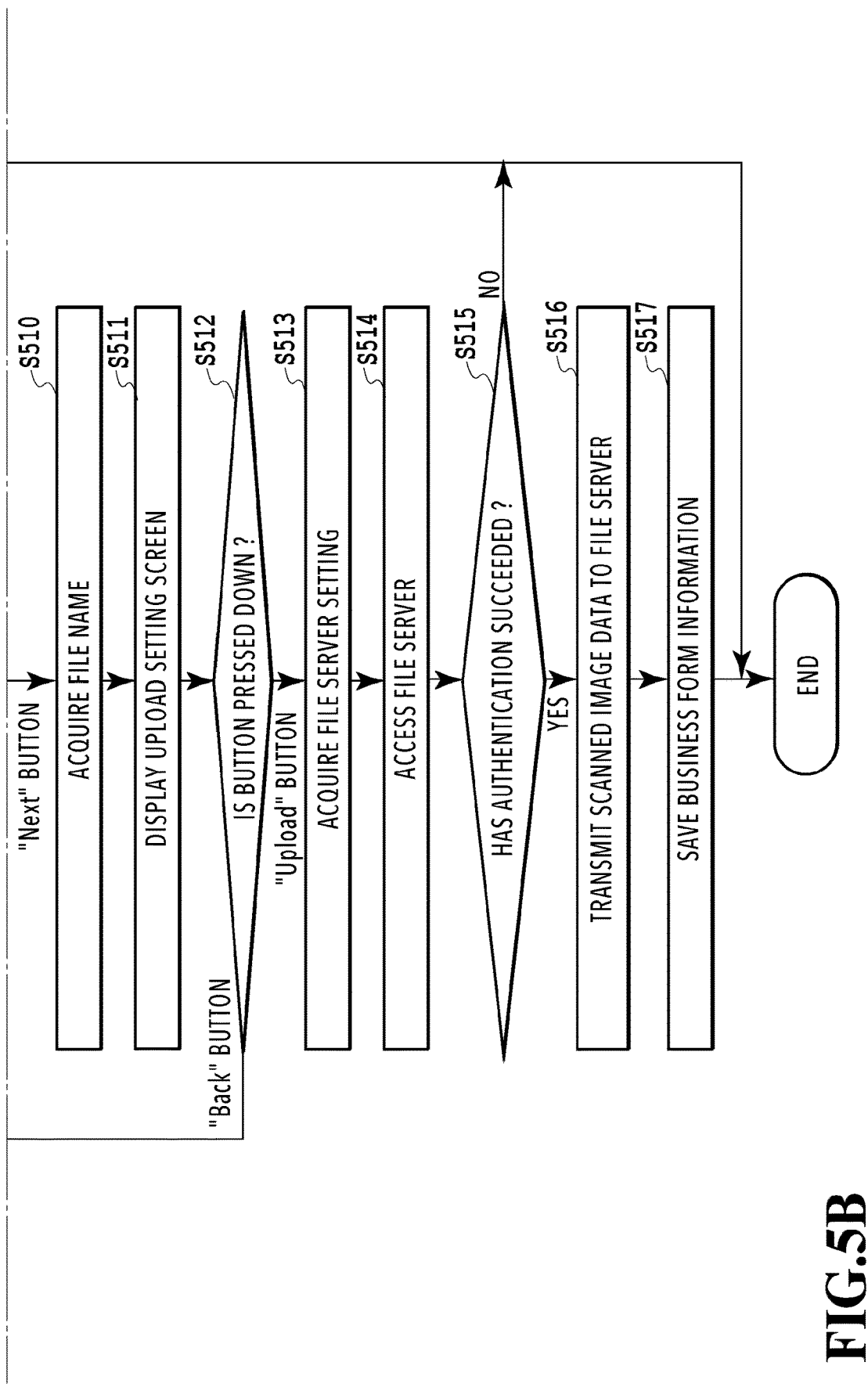
FIG. 5B is a flowchart showing an operation to transfer image data of a document scanned by the MFP to the file server.

FIG. 5 is a flowchart showing the operation to transfer image data of a document (business form) scanned by the MFP 110 to the file server 120. Each operation shown in FIG. 5 is implemented by the CPU 211 of the MFP 110 executing a control program stored in the HDD 214. In the following, by using FIG. 5, the operation in a case where scan processing is performed twice is explained. In the present embodiment, it is assumed that in the second-time scan processing, a document similar to the document scanned in the first-time scan processing (that is, a document having the same format as that of the document scanned in the first-time scan processing) is scanned. That is, it is assumed that the second-time scan processing is performed in the state where the business form information including similar area information (similar business form information) is held in the business form information holding unit 427. It is assumed that the first-time scan processing is performed in the state where the similar business form information is not held in the business form information holding unit 427.

Figure 6:
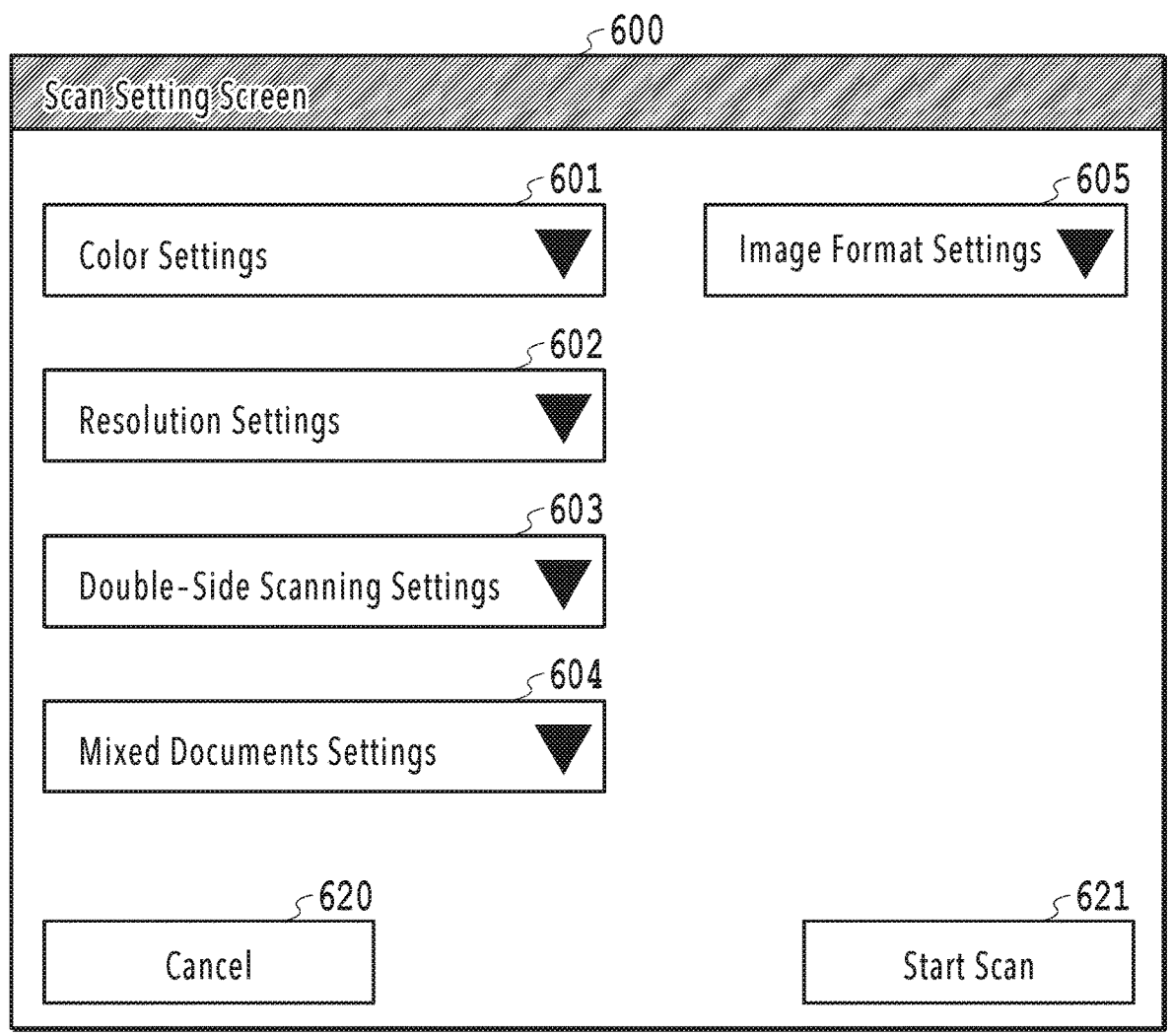
FIG. 6 is a diagram showing an example of a scan setting screen.

First, the first-time scan processing is explained. At step S501, the scan instruction unit 421 instructs the display control unit 426 to display a scan setting screen for performing various kinds of setting in the scan processing. The display control unit 426 displays a scan setting screen on the touch panel of the operation unit 220. FIG. 6 is a diagram showing an example of the scan setting screen. A [Color Settings] button 601 is a button for setting color or monochrome at the time of scanning a document. A [Resolution Settings] button 602 is a button for setting resolution at the time of scanning a document. A [Double-side Scanning Settings] button 603 is a setting button used in a case where it is desired to scan both sides of a document. A [Mixed Documents Settings] button 604 is a setting button used in a case where it is desired to scan documents different in size at a time. An [Image Format Settings] button 605 is a setting button used at the time of specifying a saving format of scanned image data. In a case where these setting buttons 601 to 605 are pressed down, candidates (alternatives) that can be set in the range supported in the MFP 110 are displayed in a drop-down list. A user selects a desired candidate from the candidates displayed in the drop-down list. The above-described setting buttons are merely exemplary and all these setting items do not need to exist, or another setting item other than those may exist. A user performs detailed setting for the scan processing via such Scan Setting Screen 600. A [Cancel] button 620 is a button used in a case where scan setting is aborted. A [Start scan] button 621 is a button for giving instructions to start scan processing for a document set on a document table and the like.

At step S502, the scan instruction unit 421 determines whether the [Start scan] button 621 is pressed or the [Cancel] button 620 is pressed. In a case of determining that the [Start scan] button 621 is pressed, the scan instruction unit 421 sends out scan instructions to perform scan processing in accordance with the setting items selected by each of the setting buttons 601 to 605 to the scan execution unit 411. Then, in the scan execution unit 411, a document is scanned (step S503). Image data obtained by scanning a document (scanned image data) is saved in the image data saving unit 412 and the scan instruction unit 421 is notified of a corresponding scanned image identifier. On the other hand, in a case where the scan instruction unit 421 determines that the [Cancel] button 620 is pressed, the processing is terminated.

At step S504, the scan instruction unit 421 acquires the scanned image data corresponding to the scanned image identifier from the image data saving unit 412. Transfer of the scanned image data from the image data saving unit 412 to the scan instruction unit 421 is performed by using, for example, the FTP.

At step S505, the metadata generation unit 422 sends instructions to analyze the scanned image data acquired from the image data saving unit 412 at step S504 to the image analysis unit 423. The image analysis unit 423 analyzes the scanned image data. Then, the image analysis unit 423 delivers the results of the analysis to the metadata generation unit 422.

Figure 7:
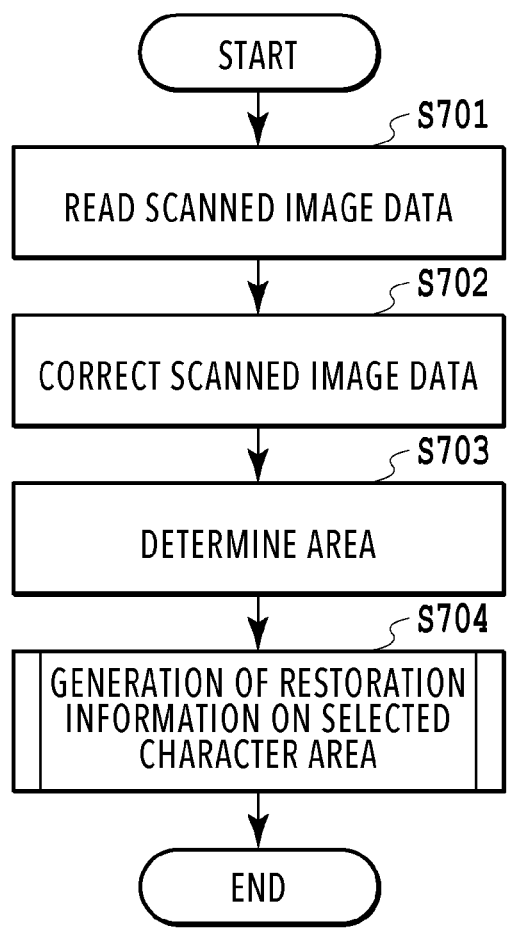
FIG. 7 is a flowchart showing image analysis processing at step S505.

Here, the image analysis processing at step S505 is explained. FIG. 7 is a flowchart showing the image analysis processing at step S505. At step S701, the image analysis unit 423 reads the scanned image data received from the metadata generation unit 422.

At step S702, the image analysis unit 423 corrects the read scanned image data to a state where it is easy to perform the subsequent area determination and character string analysis. Specifically, the image analysis unit 423 corrects the scanned image data to a state where it is easy to perform the analysis processing by performing correction of the inclination of a document shifted at the time of binarization of the image signal and at the time of the scan, rotation into the direction in which the document becomes erect for the scanned image data, wherein the erect direction of the document image is determined based on a direction in which characters in the document image may be read correctly.

At step S703, the image analysis unit 423 analyzes the scanned image data corrected at step S702 and determines at which position within the scanned image data the area of text, image, table, or line exists. Hereinafter, this determination is called area determination. By this area determination, the area information shown in Table 1 described above is obtained.

At step S704, the image analysis unit 423 compares the area information obtained at step S703 with the area information included in each piece of business form information saved in the business form information holding unit 427 by the processing at step S518, to be described later. Then, the image analysis unit 423 determines whether the image analysis unit 423 has processed a similar document (document similar to the document scanned at step S503) before. In a case of determining that the image analysis unit 423 has processed a similar document before, the image analysis unit 423 generates information (hereinafter, called restoration information) necessary for restoring the selected character area in the similar document onto the scanned image data obtained by performing the scan of this time. Restoring the selected character area refers to applying the character string in the character area brought into the selected state to the file name of the scanned image data of this time as well as brining the character area specified from the restoration information into the selected state in advance at the time of displaying a preview screen at step S507, to be described later.

Figure 8:
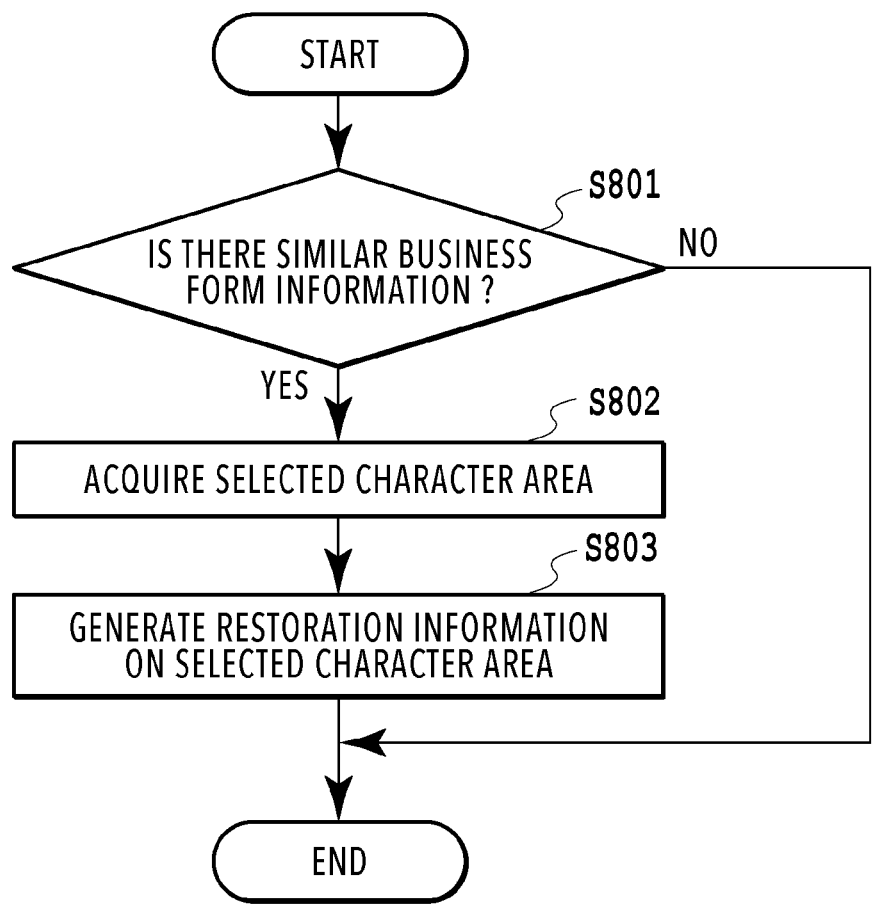
FIG. 8 is a flowchart showing generation processing of restoration information on a selected character area at step S704.

FIG. 8 is a flowchart showing the generation processing of the restoration information on the selected character area at step S704. At step S801, the image analysis unit 423 compares the area information obtained at step S703 with the area information included in each piece of business form information held by the business form information holding unit 427. Then, the image analysis unit 423 determines whether business form information including area information similar to the area information obtained at step S703 exists in the business form information holding unit 427. Due to this, whether or not the image analysis unit 423 has processed a similar document before is determined. In the first-time scan processing, business form information including similar area information is not saved in the business form information holding unit 427 (that is, the image analysis unit 423 has not processed a similar document before), and therefore, the determination result is No at step S801 and the processing is terminated. The processing at steps S802 and S803 is performed in the flow of the second-time scan processing, to be described later.

Explanation is returned to FIG. 5. At step S506, the metadata generation unit 422 acquires the area information, which is the analysis results by the image analysis unit 423. It is assumed that the area information is acquired in the CSV or XML, format, but another format may be accepted. Further, a method may also be accepted in which area information is saved once in the HDD 214 and then the area information is acquired by the metadata generation unit 422 at predetermined timing.

At step S507, the metadata generation unit 422 instructs the display control unit 426 to display a preview image. The display control unit 426 receives the area information (corresponding to the area information (Table 1) obtained by the processing at step S703) from the metadata generation unit 422. Then, the display control unit 426 displays a preview image on the touch panel of the operation unit 220 by using the area information received from the metadata generation unit 422 and the scanned image data received from the scan instruction unit 421.

Figure 9:
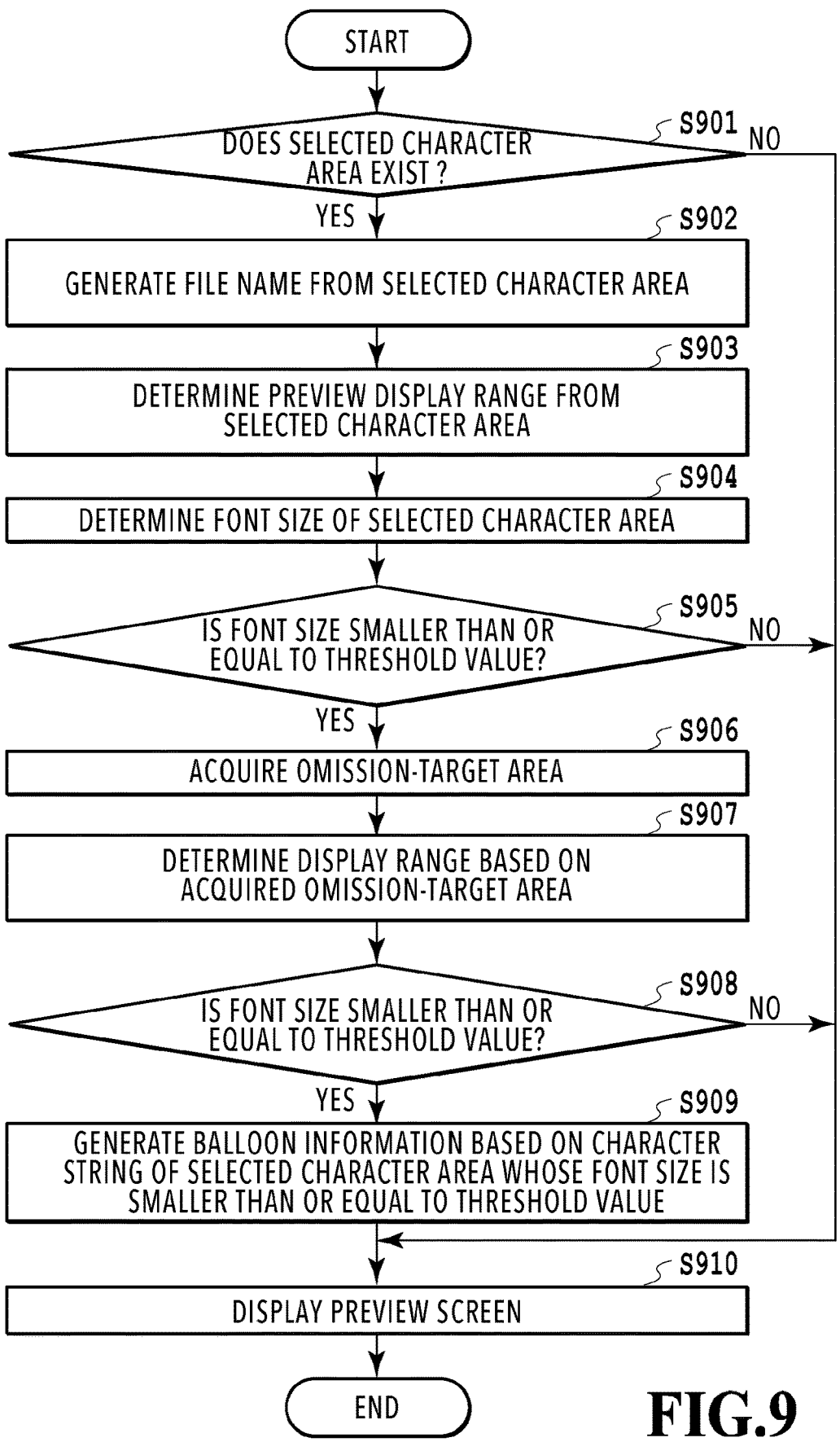
FIG. 9 is a flowchart showing display processing of a preview screen at step S507.

FIG. 9 is a flowchart showing the display processing of a preview image at step S507. At step S901, the metadata generation unit 422 determines whether the processing (acquisition of the selected character area) at step S802 shown in FIG. 8 has been performed. Then, in a case where the processing has been performed (YES at step S901), the metadata generation unit 422 advances to the processing at step S902. In a case where the processing has not been performed (NO at step S901), the metadata generation unit 422 advances to the processing at step S910. In the first-time scan processing, as described above, business form information including similar area information does not exist in the business form information holding unit 427, and therefore, it is determined that the processing (acquisition of the selected character area) at step S802 has not been performed and the processing advances to step S910. The processing at steps S902 to S909 is performed in the flow of the second-time scan processing.

Figure 10B:
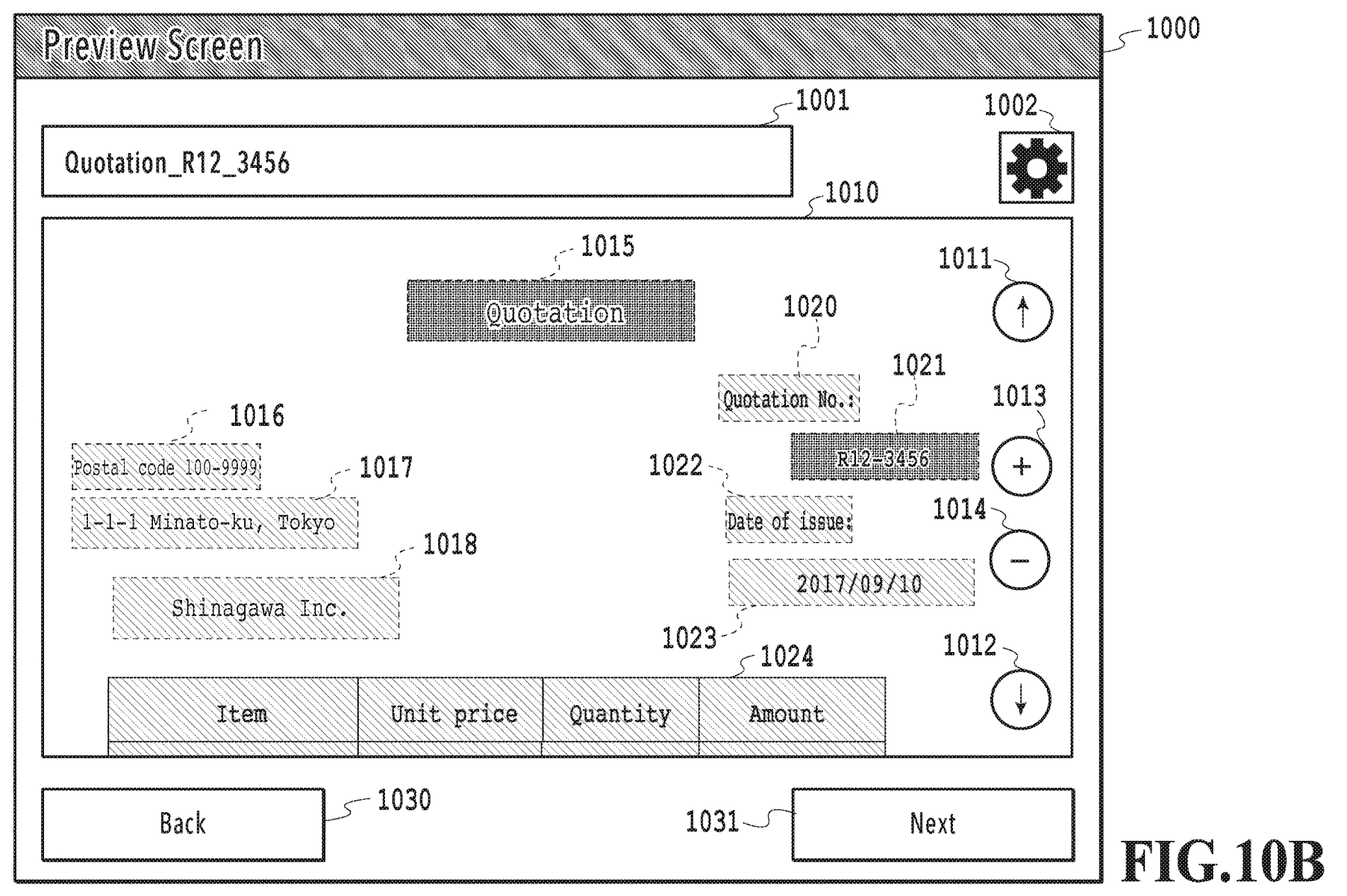

At step S910, the display control unit 426 displays a preview image on Preview screen 1000 shown in FIG. 10A to FIG. 10C by using the scanned image data received from the scan instruction unit 421 and the area information received from the metadata generation unit 422. FIG. 10A to FIG. 10C are each a diagram showing an example of the preview screen. As shown in FIG. 10A to FIG. 10C, the preview image is an image in which a scanned image is overlapped by area information. In a preview display area 1010 on Preview screen 1000, buttons 1011 to 1014 for changing the display state thereof are displayed along with the preview image. The buttons 1011 and 1012 are buttons that appear in a case where it is not possible to display the entire preview image (scanned image), that is, buttons for scrolling the display range (area within the scanned image displayed in the preview display area 1010) of the scanned image in the vertical direction. Normally, the touch panel included in the MFP 110 is not so large. Consequently, for example, in a case where the scanned image is one obtained by reading a document of A4 portrait, which is written from left to right, the initial setting is performed so as to reduce and display the scanned image so that the top end of the scanned image is aligned with the top end of the preview display area 1010 and the entire width of the scanned image in the direction of width (in the direction of short side) is just included within the preview display area 1010. That is, in the initial setting, the lower portion of the scanned image of A4 portrait is not displayed within the preview display area 1010. Consequently, in FIG. 10A, the lower portion of the scanned image obtained by scanning a business form 1600 shown in FIG. 16 is not displayed. In such a case, by pressing down the "↓" button 1012, the display range of the scanned image is scrolled downward, and therefore, it is possible to display the lower portion of the scanned image. Further, in a case where the scanned image is a document of A4 landscape or a document of A3, it is sufficient to provide buttons to scroll the display range of the scanned image in the horizontal direction. The buttons 1013 and 1014 are buttons for enlarging or reducing the display range of the scanned image and pressing down the "+" button 1013 causes the display range to zoom in and pressing down "−" button 1014 causes the display range to zoom out. It may also be possible to implement the operations by these buttons by the operation of a finger of a user, such as swipe, pinch out, and pinch in, on Preview screen 1000.

In FIG. 10A, areas 1015 to 1023 indicated by broken-line rectangles represent character areas. The character areas 1015 to 1023 are displayed on the scanned image in the preview display area 1010 in accordance with the area information obtained by the image analysis unit 423 analyzing the image data. In a case where the scanned image being displayed in the preview display area 1010 is scrolled, enlarged, or reduced, the display positions and sizes of the areas 1015 to 1023 are changed accordingly. It is possible for a user to select the character areas 1015 to 1023 and in a case where a user touches (selects) the character area, the image analysis unit 423 performs character recognition processing for the touched character area. Due to this, characters (text data) located in the character area are extracted. An area 1024 represents a table area. The text within the table area is also handled as a character area, but in the present embodiment, for simplification of explanation, it is assumed that the text within the table area 1024 is not handled as a character area. The character recognition processing is processing to recognize characters (text data) by performing matching processing of, for example, a pixel group included in the character area and a dictionary registered in advance. There is a case where the character recognition processing takes time. Because of this, in the present embodiment, it is aimed to increase the speed of the processing by performing the character recognition processing for the character area desired by a user in place of performing the character recognition processing sequentially for each of the character areas extracted by the layout analysis. The display control unit 426 sets the extracted characters (text data) in a file name display area 1001. It may also be possible to enable editing of a file name by the user operation via a software keyboard (not shown schematically) by displaying the keyboard on the touch panel in a case where the file name display area 1001 is touched.

Figure 11:
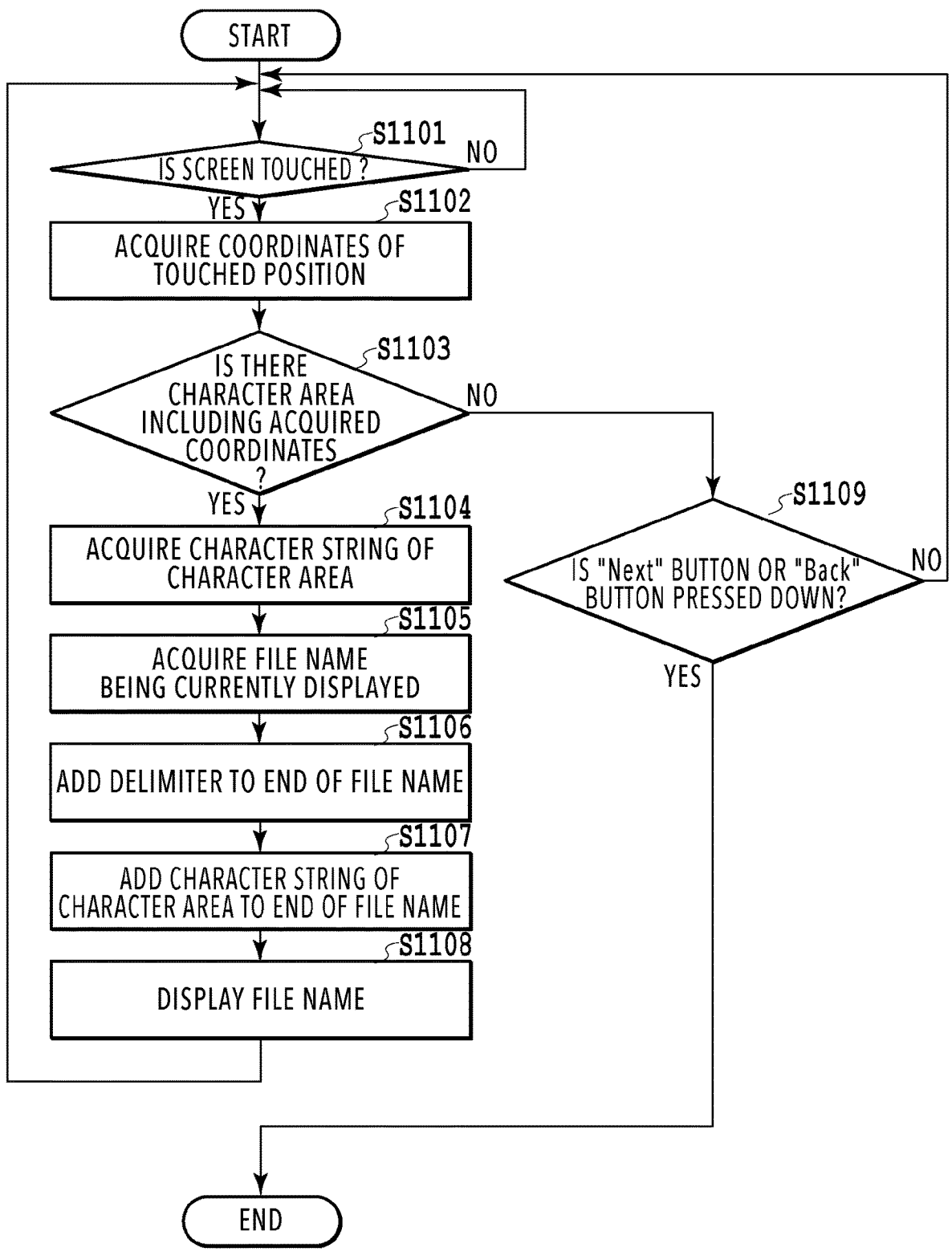
FIG. 11 is a flowchart showing processing at step S508.

Explanation is returned to FIG. 5. At step S508, the metadata generation unit 422 performs generation processing of a file name in accordance with the user operation input via Preview Screen 1000. FIG. 11 is a flowchart showing the processing at step S508. At step S1101, the metadata generation unit 422 determines whether a user has touched the touch panel of the operation unit 220. In a case of determining that the touch panel has been touched (YES at step S1101), the metadata generation unit 422 advances to the processing at step S1102 and acquires the coordinates of the touched position. In a case of determining that the touch panel has not been touched (NO at step S1101), the metadata generation unit 422 returns to the processing at step S1101.

At step S1103, the metadata generation unit 422 determines whether the coordinates of the touched position overlap the character area. Whether or not the coordinates of the touched position overlap the character area is determined by whether or not the coordinates of the touched position are included in one of the character areas 1015 to 1023 displayed in the preview display area 1010. In a case where the text within the table area 1024 is also handled as a character area, each character area within the table area 1024 is also taken as a determination target. In a case of determining that the coordinates of the touched position are included in one of the character areas (that is, the coordinates of the touched position overlap one of the character areas) (YES at step S1103), the metadata generation unit 422 determines that the character area has been selected by a user. Then, the metadata generation unit 422 advances to the processing at step S1104. On the other hand, in a case of determining that the coordinates of the touched position do not overlap any character area (NO at step S1103), the metadata generation unit 422 advances to the processing at step S1109. At step S1109, the metadata generation unit 422 determines whether a [Next] button 1031 or a [Back] button 1030 is pressed down. In a case of determining that one of the buttons 1030 and 1031 is pressed down (YES at step S1109), the metadata generation unit 422 terminates the processing and returns to the flow in FIG. 5. On the other hand, in a case of determining that none of the buttons 1030 and 1031 is pressed down (NO at step S1109), the metadata generation unit 422 returns to the processing at step S1101.

At step S1104, the image analysis unit 423 analyzes the character area overlapped by the coordinates of the touched position based on the instructions of the metadata generation unit 422. Then, the image analysis unit 423 delivers the characters (text data) obtained by the analysis to the metadata generation unit 422 as the analysis results. At step S1105, the metadata generation unit 422 acquires the file name being currently displayed in the file name display area 1001. At step S1106, the metadata generation unit 422 adds a delimiter to the end of the file name acquired at step S1105. In the present embodiment, the case where an under bar "_" is used as a delimiter is taken as an example, but it may also be possible to use another character as a delimiter. At step S1107, the metadata generation unit 422 adds characters (text data) in the character area to the file name generated at steps S1105 and S1106. In a case where the processing at step S1105 is performed for the first time in the first-time scan processing, nothing is displayed in the file name display area 1001. Consequently, in such a case, after the processing at step S1104 is performed, the processing at steps S1105 and S1106 is skipped and the processing at step S1107 is performed.

At step S1108, the metadata generation unit 422 sets anew the file name generated at step S1107 in the file name display area 1001 and returns to the processing at step S1101. Due to this, the file name being displayed in the file name display area 1001 is updated to the file name generated at step S1107. In a case where a character that cannot be used in the file server of transfer destination is included in the file name generated at step S1107, it may also be possible to delete the character at the time of setting the file name in the file name display area 1001. Further, it may also be possible to replace the character with a character than can be used in the file server of transfer destination.

Here, it is assumed that the character area 1015 and the character area 1021 on Preview Screen 1000 are selected in order in the first-time scan processing. The rectangular shaded area in FIG. 10B represents an area that has already been touched (selected) by a user as an area that should be used as a file name. In such a case, Preview Screen 1000 enters the state as shown in FIG. 10B. That is, Preview Screen 1000 enters the state where a file name of "Quotation_R12-3456" is displayed in the file name display area 1001. Further, in a case where a character area 1027 is selected in the state where the "↓," button 1012 is pressed down to move the display range of the scanned image downward and the lower portion of the scanned image is displayed in the preview display area 1010, Preview Screen 1000 enters the state shown in FIG. 10C. In FIG. 10C, the portion from the middle portion to the lower portion of the scanned image obtained by scanning the business form 1600 shown in FIG. 16 is displayed in the preview display area 1010. Further, in FIG. 10C, the file name within the file name display area 1001 is updated to "Quotation R12-3456_Kawasaki Inc.".

In the present embodiment, it is assumed that the processing at steps S505 to S508 described above is performed for the scanned image data of the first page of the document. However, it may also be possible to perform the processing at steps S505 to S508 described above for the scanned image data of the second and subsequent pages of the document. In order to implement such an aspect, for example, it is sufficient to prepare a button for switching pages in the preview display area 1010 and to make it possible for a user to specify an analysis-target page by operating the button. Then, it is sufficient to display a scanned image corresponding to the page specified by a user in the preview display area 1010 and to make is possible to set a file name from the character area on the image.

Explanation is returned to FIG. 5. At step S509, the metadata generation unit 422 determines whether the "Next" button 1031 is pressed down or the [Back] button 1030 is pressed down. In a case of determining that the [Next] button 1301 is pressed down, the metadata generation unit 422 advances to the processing at step S510. In the processing at step S510, the metadata generation unit 422 acquires the file name set in the file name display area 1001. The metadata generation unit 422 delivers the acquired file name and the scanned image identifier to the upload execution unit 424. In a case where it is determined that the [Back] button 1030 is pressed down, the processing returns to step S501.

Figure 12:
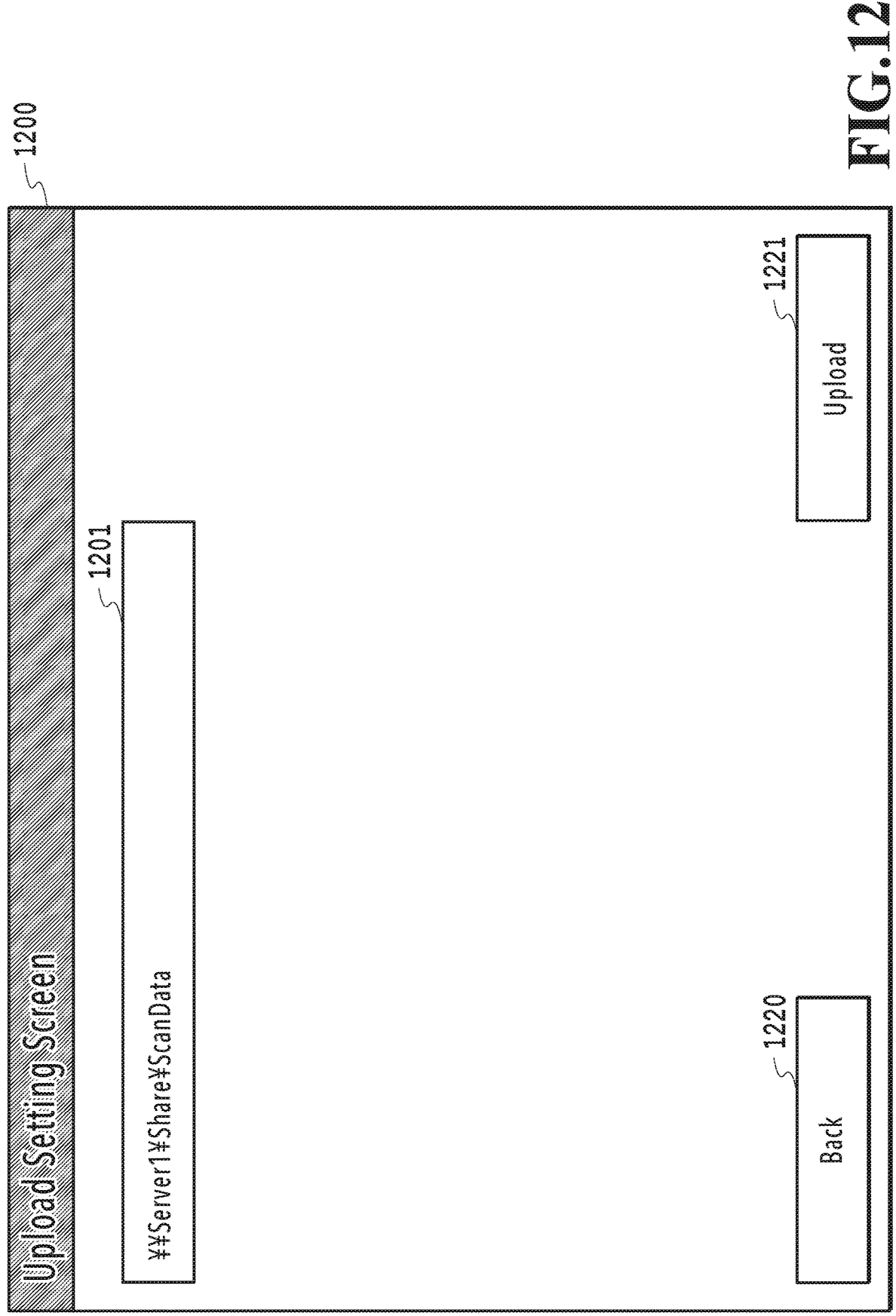
FIG. 12 is a diagram showing an example of an upload setting screen.

At step S511, the upload execution unit 424 displays an upload setting screen. A user performs detailed setting relating to the upload to the file server 120 via the upload setting screen. FIG. 12 is a diagram showing an example of the upload setting screen. On Upload Setting Screen 1200, a folder path input field 1201 receives a folder path setting of an external transfer destination to the file server 120. In the example shown in FIG. 12, "Server1ShareScanData" is input as a folder path. In a case where a user taps the folder path input field 1201, the upload execution unit 424 displays a software keyboard (not shown schematically) on the touch panel of the operation unit 220. A user inputs a folder path to the folder path input field 1201 via the software keyboard. Upon receipt of instructions to terminate the setting of a folder path, the upload execution unit 424 acquires the set folder path and terminates the display of the software keyboard. It is also possible for the folder path to be set from other than the folder path input field 1201. For example, it may also be possible to enable the setting of a folder path from an address book held by the MFP 110.

At step S512, the upload execution unit 424 determines whether an [Upload] button 1221 is pressed down or a [Back] button 1220 is pressed down. In a case of determining that the [Upload] button 1221 is pressed down, the upload execution unit 424 advances to the processing at step S513. At step S513, the upload execution unit 424 acquires a file server setting stored in advance in a memory, such as the HDD 214. In the file server setting, a user name and a password for logging in to the file server 120 are included.

folder path from the host name and the start point of the folder path included in the file server setting, and the folder name input by a user.

At step S517, the image analysis unit 423 saves the area information acquired by the processing at step S506 and the selection information indicating the character area selected by the processing at step S508 as business form information in the business form information holding unit 427. In Table 2, an example of the business form information saved in the business form information holding unit 427 is shown.

TABLE 2

| Business form No. | No. | X-coordinate of area | Y-coordinate of area | Width of area | Height of area | Kind | Selection information |
|---|---|---|---|---|---|---|---|
| 1 | 1 | 191 | 24 | 120 | 30 | text | 1 |
|   | 2 | 324 | 74 | 84 | 22 | text | — |
|   | 3 | 377 | 99 | 75 | 22 | text | 2 |
|   | 4 | 15 | 104 | 91 | 22 | text | — |
|   | 5 | 324 | 128 | 70 | 22 | text | — |
|   | 6 | 15 | 130 | 211 | 22 | text | — |
|   | 7 | 362 | 155 | 90 | 22 | text | — |
|   | 8 | 37 | 166 | 136 | 30 | text | — |
|   | 9 | 37 | 190 | 480 | 120 | table | — |
|   | 10 | 214 | 311 | 91 | 22 | text | — |
|   | 11 | 214 | 335 | 136 | 22 | text | — |
|   | 12 | 236 | 359 | 134 | 30 | text | 3 |
|   | 13 | 413 | 367 | 45 | 22 | text | — |

In a case where it is determined that the [Back] button 1220 is pressed down, the processing returns to step S507.

At step S514, the upload execution unit 424 accesses the file server 120. At this time, the upload execution unit 424 transmits the user name and the password included in the file server setting acquired at step S513 to the file server 120 and receives the results of authentication by the file server 120.

At step S515, the upload execution unit 424 determines whether or not the authentication has succeeded (logging in to the file server 120 has succeeded). Then, in a case where the authentication has failed (NO at step S515), the upload execution unit 424 terminates the processing and in a case where the authentication has succeeded (YES at step S515), the upload execution unit 424 advances to the processing at step S516. At step S516, the upload execution unit 424 generates a file from the scanned image data corresponding to the scanned image identifier received from the metadata generation unit 422 in the processing at step S510. Then, the upload execution unit 424 uploads the generated file to the folder path acquired at step S511.

In the present embodiment, the case is taken as an example where a character string extracted by the image analysis is used as a file name, but it is also possible to use the character string for other purposes. For example, it is also possible to specify a telephone number corresponding to the character string and to perform fax transmission of the scanned image data to the specified telephone number as a destination. Further, for example, it is also possible to specify a mail address corresponding to the character string and to perform mail transmission of the scanned image data to the mail address as a destination. In the present embodiment, the case is taken as an example where a user is caused to input a folder path on Upload setting screen 1200. However, it may also be possible to cause a user to input only the name of a folder (folder name) storing scanned image data on Upload setting screen 1200 by including the host name and the start point of the folder path in the file server setting. Then, it may also be possible to generate a In Table 2, the business form number is allocated individually for each piece of business form information saved in the business form information holding unit 427. Here, as an example, "1" indicating that the business form is the first kind of business form is allocated. Further, in Table 2, the figures in the selection information indicate the order in which each character area is selected by a user in the processing at step S508. Furthermore, "-" in the selection information indicates that the character area is not selected by a user.

Next, the second-time scan processing is explained. In the second-time scan processing, as described above, it is assumed that a document (business form 1700 shown in FIG. 17) similar to the document (business form 1600 shown in FIG. 16) scanned in the first-time scan processing is scanned. The processing at steps S501 to S504 in the second-time scan processing is the same as that in the first-time scan processing, and therefore, explanation is omitted.

In Table 3, an example of the area information obtained in the processing at step S505 of the second-time scan processing is shown. Here, the area information shown in Table 3 and the area information (area information obtained in the processing at step S505 of the first-time scan processing) included in the business form information saved in the business form information holding unit 427 shown in Table 2 are compared. Then, it is known that a difference between both pieces of area information lies only in the width of area of the number 8 and the areas of the other numbers coincide with each other in the X-coordinate, Y-coordinate, width, and height. Consequently, the image analysis unit 423 determines that the above-described business form information saved in the business form information holding unit 427 is similar business form information. Because of this, at step S801 of the second-time scan processing, the image analysis unit 423 determines that the image analysis unit 423 has processed a similar document before (YES at step S801) and advances to the processing at step S802. At the time of a comparison of the area information, it may also be possible to make a comparison for all the areas included in the area information, or it may also be possible to make a comparison only for the area whose kind is text, that is, only for the character area. Further, whether or not each piece of area information is similar to each other may be determined based on whether or not a ratio (similarity) indicating how many areas that coincide with each other exist for the total number of comparison-target areas is larger than or equal to a threshold value determined in advance, or may be determined in accordance with another criterion. The similarity determination of area information is not the main purpose of the present embodiment, and therefore, detailed explanation is omitted.

TABLE 3

| No. | X-coordinate of area | Y-coordinate of area | Width of area | Height of area | Kind |
|---|---|---|---|---|---|
| 1 | 191 | 24 | 120 | 30 | text |
| 2 | 324 | 74 | 84 | 22 | text |
| 3 | 377 | 99 | 75 | 22 | text |
| 4 | 15 | 104 | 91 | 22 | text |
| 5 | 324 | 128 | 70 | 22 | text |
| 6 | 15 | 130 | 211 | 22 | text |
| 7 | 362 | 155 | 90 | 22 | text |
| 8 | 37 | 166 | 163 | 30 | text |

TABLE 3-continued

| No. | X-coordinate of area | Y-coordinate of area | Width of area | Height of area | Kind |
|---|---|---|---|---|---|
| 9 | 37 | 190 | 480 | 120 | table |
| 10 | 214 | 311 | 91 | 22 | text |
| 11 | 214 | 335 | 136 | 22 | text |
| 12 | 236 | 359 | 134 | 30 | text |
| 13 | 413 | 367 | 45 | 22 | text |

At step S802, the image analysis unit 423 determines a restoration candidate area from the character areas in the scanned image data of this time (scanned image data obtained by scanning the business form 1700 shown in FIG. 17) based on the selection information included in the similar business form information. Specifically, the image analysis unit 423 specifies a character area that most resembles the character area in the X-coordinate, Y-coordinate, width, and height, whose selection information stores a number in the similar business form information (business form information shown in Table 2) from each character area shown in Table 3 and determines the specified character area to be a restoration candidate area. Here, each of the areas whose numbers are "1", "3", and "12" shown in Table 3 is specified as an area that most resembles each of the character areas whose selection information stores "1", "2", and "3" in Table 2.

At step S803, the image analysis unit 423 generates restoration information on the selected character area. Specifically, the image analysis unit 423 performs character recognition processing for the restoration candidate area determined at step S802. In the first-time scan processing, in the processing at step S506, the metadata generation unit 422 acquires the area information indicating the coordinates and the size for each area as shown in Table 1 from the image analysis unit 423. On the other hand, in the second-time scan processing, in the processing at step S506, the metadata generation unit 422 acquires restoration information (information shown in Table 4) obtained by adding the selection information and the character recognition results to the area information from the image analysis unit 423.

TABLE 4

| No. | X-coordinate of area | Y-coordinate of area | Width of area | Height of area | Kind | Selection information | Character string within area |
|---|---|---|---|---|---|---|---|
| 1 | 191 | 24 | 120 | 30 | text | 1 | Quotation |
| 2 | 324 | 74 | 84 | 22 | text | — | |
| 3 | 377 | 99 | 75 | 22 | text | 2 | R12-3457 |
| 4 | 15 | 104 | 91 | 22 | text | — | |
| 5 | 324 | 128 | 70 | 22 | text | — | |
| 6 | 15 | 130 | 211 | 22 | text | — | |
| 7 | 362 | 155 | 90 | 22 | text | — | |
| 8 | 37 | 166 | 163 | 30 | text | — | |
| 9 | 37 | 190 | 480 | 120 | table | — | |
| 10 | 214 | 311 | 91 | 22 | text | — | |
| 11 | 214 | 335 | 136 | 22 | text | — | |
| 12 | 236 | 359 | 134 | 30 | text | 3 | Kawasaki Inc. |
| 13 | 413 | 367 | 45 | 22 | text | — | |

At step S507, the metadata generation unit 422 instructs the display control unit 426 to display a preview screen. The display control unit 426 generates a preview image by using the scanned image data received from the scan instruction unit 421 and the restoration information (area information to which selection information and character recognition results are added) received from the metadata generation unit 422. Then, the display control unit 426 displays the generated preview image on the touch panel of the operation unit 220. At this time, the display control unit 426 generates a file name from the selection information and the character recognition results and displays the file name in a file name display area on the preview screen. Further, the display control unit 426 determines the display range of the scanned image by using the area information and the selection information.

Here, by using FIG. 9, details of the processing at step S507 in the second-time scan processing are explained. At step S901, the metadata generation unit 422 determines whether the processing (acquisition of selected character area) at step S802 shown FIG. 8 has been performed. In the second-time scan processing, as described above, the processing at step S802 has been performed and the selected character area exists (YES at step S901), and therefore, the metadata generation unit 422 advances to the processing at step S902.

At step S902, the metadata generation unit 422 performs generation processing of a file name by using characters (text data) of the selected character area acquired at step S802. Specifically, the metadata generation unit 422 generates a file name of "Quotation R12-3457_Kawasaki Inc." by using "Quotation", "R12-3457", and "Kawasaki Inc." shown in Table 4, and the delimiter under bar "_". Due to this, in a case where a similar document is scanned, it is possible to generate an appropriate file name while saving time and effort for selection by a user.

At step S903, the display control unit 426 determines the display range of the scanned image so that all the selected character areas acquired at step S802 are displayed on the preview screen. For example, in a case where a scanned image obtained by scanning a document of A4 portrait is displayed on a horizontally-elongated display screen, the scanned image is not included in the vertical (height) direction depending on the size of the display screen. In such a case, for the character area not displayed on the preview screen, it is necessary to, for example, scroll the screen in order to check whether the character area is used as a file name, and therefore, time and effort of a user are required. Further, in a case where the scanned image is reduced so that the entire image is included on the display screen, the font size of the character area becomes small and the characters within the character area become hard to recognize visually. Consequently, in the present embodiment, as will be explained in the following, the display range (also called preview display range) of the scanned image is determined so that all the selected character areas are at least included within the preview screen.

Figure 13:
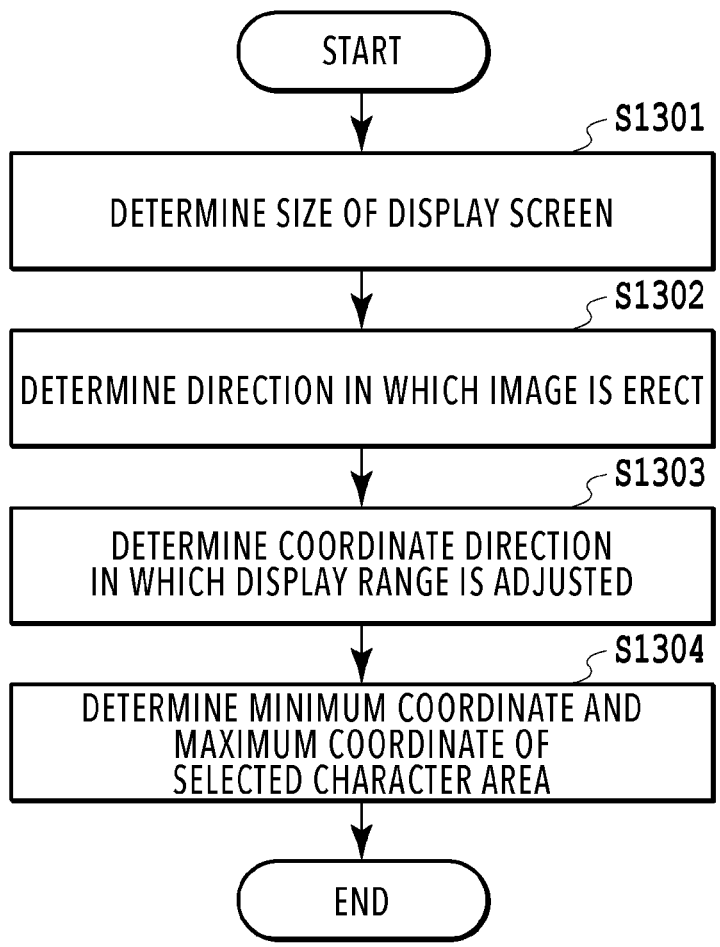
FIG. 13 is a flowchart showing processing at step S903.

FIG. 13 is a flowchart showing the processing at step S903. At step S1301, the display control unit 426 acquires the size of the display screen (here, Preview screen 1000) on which a preview image is displayed. At this time, it may also be possible to acquire the size of the display device (touch panel of the operation unit 220). Then, the display control unit 426 determines whether the display screen is elongated in the vertical direction (Y-coordinate direction) or in the horizontal direction (X-coordinate direction). Further, at step S1302, the display control unit 426 determines the direction in which the scanned image is erect. For example, the display control unit 426 determines the direction in which the scanned image is erect from the analysis results of the image analysis at step S505.

At step S1303, the display control unit 426 determines which of the X-coordinate and the Y-coordinate of the selected character area is used to derive a preview display range based on the determination results at steps 1301 and S1302. For example, in a case where a scanned image obtained by scanning a document of A4 portrait is displayed on a horizontally-elongated display screen, for the vertical (height) direction, there is a possibility that it is not possible to include the scanned image within the display screen. Consequently, in such a case, it is necessary to derive a preview display range based on the vertical (height) direction, and therefore, the display control unit 426 determines to use the Y-coordinate. Similarly, also in a case where a scanned image obtained by scanning a document of A4 landscape is displayed on a vertically-elongated display screen, the display control unit 426 determines to use the X-coordinate.

Figure 14A:
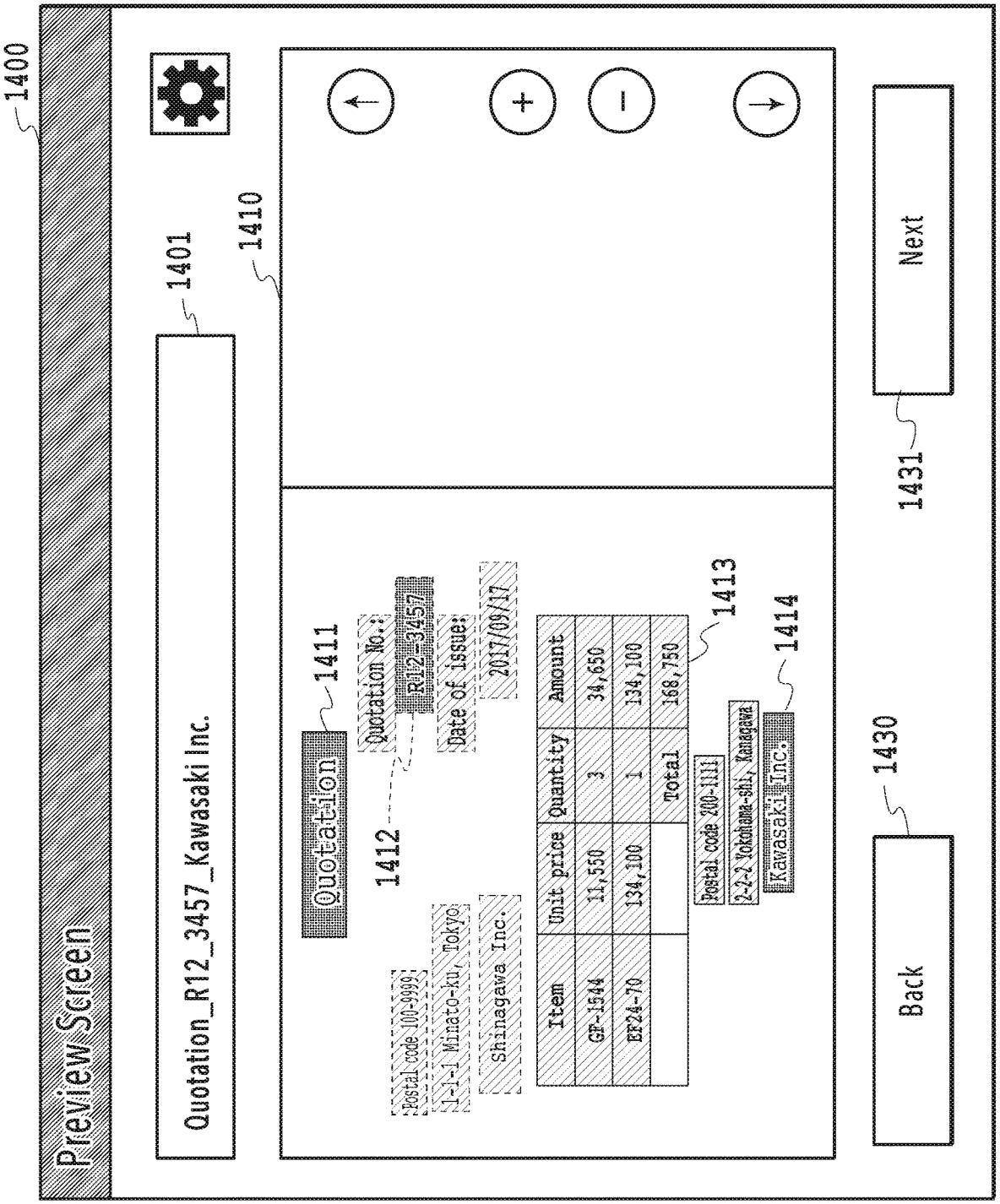

At step S1304, the display control unit 426 derives the minimum coordinate and the maximum coordinate from the coordinates of each selected character area based on the coordinate direction determined at step S1303. For example, in a case of determining to derive a preview display range by using the Y-coordinate, the display control unit 426 extracts the minimum Y-coordinate and the maximum Y-coordinate from the Y-coordinates of the three selected character areas whose numbers are "1", "3", and "12" shown in Table 4. Then, the display control unit 426 derives a display range in the vertical (height) direction from the extracted minimum Y-coordinate and maximum Y-coordinate. At this time, the minimum Y-coordinate is "24" of "Quotation" whose number is "1" and the maximum Y-coordinate is "359" of "Kawasaki Inc." whose number is "12". The display control unit 426 derives a display range of the Y-coordinate from the minimum Y-coordinate and the maximum Y-coordinate and further, derives a display range of the X-coordinate so that the aspect ratio of the scanned image is kept. Due to this, a preview display range of the scanned image is derived. As a result of this, as shown in FIG. 14A, the scanned image is displayed so that "Quotation" of a selected character area 1411 of the minimum Y-coordinate and "Kawasaki Inc." of a selected character area of the maximum Y-coordinate are included within a preview display area 1410. In a case where a character area exists in the vicinity of the selected character area, there is a possibility that the character area is erroneously set as the selected character area. In such a case, it is sufficient to derive the minimum coordinate and the maximum coordinate of the selected character area by providing a margin corresponding to the character area. FIG. 14B shows an example of the preview display range that is derived in a case where a character area 1415 exists in the vicinity of the selected character area 1414 of the maximum Y-coordinate. In the example shown in FIG. 14B, the scanned image is displayed in the preview display area 1410 by taking the Y-coordinate of the character area 1415 as the maximum Y-coordinate. For example, in a case where "Kawasaki Inc." is erroneously set as the selected character area in the second-time scan processing despite that "PQR office" is selected in the first-time scan processing, "PQR office", which is the original selected character area, is no longer displayed in the preview display area 1410. However, by providing a margin as described above, it is also possible to include "PQR office" (the character area 1415), which is the original selected character area, in the preview display area 1410, and therefore, it is made possible to cause a user to recognize that the selected character area is erroneously set. Further, by displaying the character area "PQR office" in the preview display area 1410, it is made possible for a user to easily select "PQR office" anew without the need to perform the screen operation, such as scrolling.

By deriving a preview display range in this manner, in a case where a file name is automatically generated by using a selected character area of a similar document, it is made possible to check which character area is used as a file name without the need to perform the operation, such as scrolling, for a preview screen. However, in a case where the selected character areas exist in a wide range of the scanned image, the preview image is reduced significantly and the font size of each selected character area becomes small accordingly, and therefore, it becomes difficult to check the characters in each selected character area. Because of this, in the present embodiment, by the processing at steps S904 and S905, to be described later, the font size of the selected character area is set to an optimum value.

At step S904, the display control unit 426 determines a font size of the character in each selected character area based on the preview display range determined at step S903. The determination of a font size is performed by deriving the height and width of each selected character area from the size of the preview display area 1410 and the size of the preview display range and deriving which point the font size of the character in each selected character area is based on the derived height and width.

At step S905, the display control unit 426 checks whether the font size of each selected character area determined at step S904 is smaller than or equal to a threshold value (for example, 10 point) set in advance. The threshold value may also be defined in advance in the additional function module 420, or it may also be possible for a user to be capable of changing the setting on the setting screen (not shown schematically) and the like. In a case where at least one selected character area whose determined font size is smaller than or equal to the threshold value exists (YES at step S905), the display control unit 426 advances to the processing at step S906. On the other hand, in a case where the determined font size of each selected character area exceeds the threshold value (NO at step S905), the display control unit 426 advances to the processing at step S910.

At step S906, the display control unit 426 determines an area that can be omitted within the preview display range. In the present embodiment, the display control unit 426 determines an area whose kind is other than text and which does not include a selected character area as an omission target from each area shown in Table 4. In the example shown in Table 4, the area whose number is "9", which is the area of table (hereinafter, called table area), is determined as an omission target.

Figure 15A:
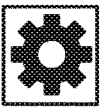

At step S907, the display control unit 426 determines a display range of the scanned image based on the coordinates of the omission-target area acquired at step S906. In a case where a table area 1413 shown in FIG. 14A is omitted, the display control unit 426 displays the scanned image from which the table area 1413 has been omitted on the preview screen as shown in FIG. 15A. At this time, the display control unit 426 displays a "+" mark 1416 so that it is known that the table area 1413 has been omitted. In a case where the "+" mark 1416 is touched (selected) by a user operation, the omitted table area 1413 is displayed again. By the omission-performed display such as this, even in a case where the selected character areas used for the file name exist in a wide range of the scanned image, it is made possible to easily check the contents of the selected character area. Here, the case is taken as an example where part of the areas is omitted in the Y-coordinate direction, and in a case where Preview Screen 1400 is vertically elongated, it is sufficient to delete part of the areas in the X-coordinate direction similarly.

In a case where a selected character area exists on the right side or the left side of the table area 1413 in FIG. 14A, on a condition that the omission-performed display as shown in FIG. 15A is produced, the selected character area is no longer displayed on the preview screen. Consequently, in a case where the area indicated by the maximum coordinate and the minimum coordinate (here, the maximum Y-coordinate and the minimum Y-coordinate) of the table area 1413 overlaps one of the selected character areas, the display control unit 426 does not select the table area 1413 as an omission target. Further, there is a case where a plurality of areas other than text exists in each area shown in Table 4. In such a case, the display control unit 426 selects one or a plurality of areas as an omission target from those areas in accordance with the length in the Y-coordinate direction that should be omitted in order to make the font size of the selected character area larger than or equal to the threshold value. At this time, it may also be possible to select an omission target by giving priority to each kind of area, or to select an omission target by giving priority to each position within the business form of the area. For example, it may also be possible to select an omission target by giving priority to the area located at the center. However, in a scanned image whose font size of the selected character area is originally small, there is a case where it is not possible to enlarge the font size of the selected character area up to a desired size even by producing an omission-performed display. In such a case, it is still difficult to check the characters of the selected character area. Consequently, in the present embodiment, the characters of the selected character area are displayed in a display area (here, a balloon) provided separately from the selected character area by the processing at steps S908 and S909, to be described later.

At step S908, the display control unit 426 checks whether the font size of each selected character area is smaller than or equal to a threshold value set in advance after determining the display range of the scanned image at step S907. In a case where at least one selected character area whose font size is smaller than or equal to the threshold value exists (YES at step S908), the display control unit 426 advances to the processing at step S909. In a case where the font size of each selected character area exceeds the threshold value (NO at step S908), the display control unit 426 advances to the processing at step S910.

At step S909, balloon information on the character string of the selected character area whose font size is smaller than or equal to the threshold value is generated. The balloon information is information for displaying a balloon 1417 for the selected character area (here, the selected character area 1414) whose font size is smaller than or equal to the threshold value as shown in FIG. 15B. FIG. 15B shows the example in which the font size of the selected character area 1414 is smaller than or equal to the threshold value even after the omission-performed display is produced. The balloon is displayed over the scanned image in the preview display area 1410 and displayed in the vicinity of the selected character area. Normally, a balloon is displayed at the portion where no character area exists, but in a case where there is not a position at which no character area exists in the vicinity of the selected character area, it is assumed that a balloon is displayed on the right side of the selected character area. For the other selected character areas 1411 and 1412, no balloon is displayed because the font size thereof exceeds the threshold value. By the balloon display such as this, it is made possible to easily check the contents of the selected character area even in a case where each selected character area used for a file name is arranged in a wide range of the scanned image.

At step S910, the display control unit 426 generates a preview image in accordance with the processing results at steps S902 to S909 by using the scanned image data and the area information. In a case where the balloon information is generated at step S909, the display control unit 426 generates a preview image by using the balloon information also. Then, the display control unit 426 displays the generated preview image on the touch panel of the operation unit 220.

As described above, in the present embodiment, by the display control shown in FIG. 9, control is performed so that while all the selected character areas are included within the preview display range, the characters of each selected character area are displayed in an appropriate font size. Due to this, in the initial state where Preview Screen 1400 is displayed, each selected character area is displayed in the preview display area 1410. Consequently, it is no longer necessary to perform the screen operation for checking the characters used for generation of a file name, and therefore, it is made possible to save time and effort of a user. Further, by the omission-performed display or the balloon display, the characters of each selected character area are displayed in an appropriate font size, and therefore, it is made easier for a user to check the contents of each selected character area. In the display state of the initial setting shown in FIG. 10A, in a case where the selected character areas having the minimum Y-coordinate and the maximum Y-coordinate are included within the preview display range, it may also be possible to skip the processing at step S902 to step S909 and to advance to the processing at step S910. Further, the order of the processing at step S507 is not limited to the order shown in FIG. 9. For example, it may also be possible to perform the processing at steps S909 and S910 after the determination at step S905 results in YES, and then to terminate the processing.

Further, in the present embodiment, in the processing at step S517, the business form information is saved in the business form information holding unit 427. However, there is a case where a business form similar to the business form scanned in the first-time scan processing is scanned in the second-time scan processing and the selected state of the character area used for a file name does not change between the first-time scan processing and the second-time scan processing. In such a case, it may also be possible not to save the business form information in the business form information holding unit 427 at step S517 of the second-time scan processing. On the other hand, in a case where the selected state of the character area used for the file name is changed in the second-time scan processing, it may also be possible to modify at least the selection information of the business form information saved in the business form information holding unit 427.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In a scene in which setting of a file name or the like is performed by using a character string obtained by performing OCR processing for a scanned image, it is possible to present the character string used for the setting of the file name or the like in a mode in which it is easy for a user to check the character string.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-008956 filed Jan. 23, 2018, which is hereby incorporated by reference wherein in its entirety.

What is claimed is:

1. An apparatus comprising:
   a display;
   a storage; and
   at least one processor that performs:
   extracting a plurality of character string areas that are recognized as character strings from a scanned image obtained by scanning a document;
   determining whether document information of a document similar to the scanned image is stored in the storage, wherein the document information includes selection information that indicates character string areas previously selected for the similar document by a user;
   controlling the display to display the scanned image on a preview screen so that a user can select a character string area from the extracted plurality of character string areas,
   wherein, as an initial state where the scanned image is displayed on the preview screen when it is determined that the document information of the similar document is stored in the storage, the at least one processor controls to display the scanned image so that all of character string areas that are specified based on the selection information included in the document information of the similar document are displayed within the preview screen and further controls to display the specified all of character string areas in a selected state on the preview screen;
   generating information relating to the scanned image by using character strings corresponding to the character string areas displayed in the selected state as the initial state and/or character strings corresponding to character ter string areas selected by the user via the preview screen; and
   storing, into the storage, selection information that indicates the character string areas that is used for generating the information relating to the scanned image.

2. The apparatus according to claim 1, wherein
   the document information stored in the storage includes position information of the character string areas, and
   wherein the at least one processor determines whether document information of a document similar to the scanned image is stored in the storage by comparing the character string areas extracted from the scanned image with the position information included in the document information stored in the storage.

3. The apparatus according to claim 1, wherein
   the at least one processor determines display range of the scanned image that is displayed on the preview screen based on positions of character string areas to be displayed in the selected state as the initial state.

4. The apparatus according to claim 3, wherein the at least one processor takes a Y-coordinate direction as a reference in a case where the preview screen is a screen longer in an X-coordinate direction than in the Y-coordinate direction, or takes the X-coordinate direction as a reference in a case where the preview screen is a screen longer in the Y-coordinate direction than in the X-coordinate direction, and acquires coordinates indicating positions of character string area to be displayed in the selected state as the initial state with respect to the coordinate direction taken to be the reference, and determines the display range in the coordinate direction of the scanned image from the maximum coordinate and the minimum coordinate of the acquired coordinates.

5. The apparatus according to claim 3, wherein the at least one processor produces, in a case of determining that font size of at least one of character string areas to be displayed in the selected state as the initial state is smaller than or equal to a predetermined threshold value, a display by omitting part of areas within the display range.

6. The apparatus according to claim 5, wherein the part of areas to be omitted is an area not including a character string area.

7. The apparatus according to claim 5, wherein the part of areas to be omitted is an area not including each character string area to be displayed in the selected state as the initial state.

8. The apparatus according to claim 5, wherein the at least one processor omits, in a case where the preview screen is a screen longer in an X-coordinate direction than in a Y-coordinate direction, the part of areas so that the length in the X-coordinate direction of the display range becomes short, or omits, in a case where the preview screen is a screen longer in the Y-coordinate direction than in the X-coordinate direction, the part of areas so that the length in the Y-coordinate direction of the display range becomes short.

9. The apparatus according to claim 3, wherein the at least one processor determines, in a case where another character string area exists in the vicinity of character string areas to be displayed in the selected state as the initial state, the display range of the scanned image so that the other character string area is also included within the preview screen.

10. The apparatus according to claim 1 wherein the at least one processor controls to display, in a case of determining that font size of at least one of character string areas to be displayed in the selected state as the initial state is smaller than or equal to a predetermined threshold value, the character string of the character string area whose font size is smaller than or equal to the predetermined threshold value in a display area different from the character string area and which is arranged over the scanned image on the preview screen.

11. The apparatus according to claim 10, wherein the display area is displayed in the vicinity of the character string area whose font size is determined to be smaller than or equal to the threshold value.

12. The apparatus according to claim 10, wherein the font size of the character string that is displayed in the display area is larger than the threshold value.

13. The apparatus according to claim 10, wherein the display area is a balloon.

14. The apparatus according to claim 1, wherein the information relating to the scanned image data is a file name of the scanned image data.

15. A method executed by an apparatus, comprising:
extracting a plurality of character string areas that are recognized as character strings from a scanned image obtained by scanning a document;
determining whether document information of a document similar to the scanned image is stored in a storage, wherein the document information includes selection information that indicates character string areas previously selected for the similar document by a user;
controlling a display to display the scanned image on a preview screen so that a user can select a character string area from the extracted plurality of character string areas,
wherein, as an initial state where the scanned image is displayed on the preview screen when it is determined that the document information of the similar document is stored in the storage, the scanned image is displayed so that all of character string areas that are specified based on the selection information included in the document information of the similar document are displayed within the preview screen and the specified all of character string areas are further displayed in a selected state on the preview screen;
generating information relating to the scanned image by using character strings corresponding to the character string areas displayed in the selected state as the initial state and/or character strings corresponding to character string areas selected by the user via the preview screen; and
storing, into the storage, selection information that indicates the character string areas that is used for generating the information relating to the scanned image.

16. A non-transitory computer readable storage medium storing a program for causing a computer to perform a method, the method comprising:
extracting a plurality of character string areas that are recognized as character strings from a scanned image obtained by scanning a document;
determining whether document information of a document similar to the scanned image is stored in a storage, wherein the document information includes selection information that indicates character string areas previously selected for the similar document by a user;
controlling a display to display the scanned image on a preview screen so that a user can select a character string area from the extracted plurality of character string areas,
wherein, as an initial state where the scanned image is displayed on the preview screen when it is determined that the document information of the similar document is stored in the storage, the scanned image is displayed so that all of character string areas that are specified based on the selection information included in the document information of the similar document are displayed within the preview screen and the specified all of character string areas are further displayed in a selected state on the preview screen;
generating information relating to the scanned image by using character strings corresponding to the character string areas displayed in the selected state as the initial state and/or character strings corresponding to character string areas selected by the user via the preview screen; and storing, into the storage, selection information that indicates the character string areas that is used for generating the information relating to the scanned image.

17. A system comprising:
a storage; and
at least one processor that performs:
extracting a plurality of character string areas that are recognized as character strings from a scanned image obtained by scanning a document;
determining whether document information of a document similar to the scanned image is stored in the storage, wherein the document information includes selection information that indicates character string areas previously selected for the similar document by a user;
displaying the scanned image on a preview screen so that all of character string areas that are specified based on the selection information included in the document information of the similar document are displayed in a selected state within the preview screen, wherein a user can further select a character string area from the extracted plurality of character string areas via the preview screen,
generating information relating to the scanned image by using character strings corresponding to the character string areas displayed in the selected state and/or character strings corresponding to character string areas selected by the user via the preview screen; and
storing, into the storage, selection information that indicates the character string areas that is used for generating the information relating to the scanned image.

18. A method comprising:
extracting a plurality of character string areas that are recognized as character strings from a scanned image obtained by scanning a document;
determining whether document information of a document similar to the scanned image is stored in a storage, wherein the document information includes selection information that indicates character string areas previously selected for the similar document by a user;
displaying the scanned image on a preview screen so that all of character string areas that are specified based on the selection information included in the document information of the similar document are displayed in a selected state within the preview screen, wherein a user can further select a character string area from the extracted plurality of character string areas via the preview screen,
generating information relating to the scanned image by using character strings corresponding to the character string areas displayed in the selected state and/or character strings corresponding to character string areas selected by the user via the preview screen; and
storing, into the storage, selection information that indicates the character string areas that is used for generating the information relating to the scanned image.

19. A non-transitory computer readable storage medium storing a program for causing a system to perform a method, the method comprising:
extracting a plurality of character string areas that are recognized as character strings from a scanned image obtained by scanning a document;
determining whether document information of a document similar to the scanned image is stored in the storage, wherein the document information includes selection information that indicates character string areas previously selected for the similar document by a user;
displaying the scanned image on a preview screen so that all of character string areas that are specified based on the selection information included in the document information of the similar document are displayed in a selected state within the preview screen, wherein a user can further select a character string area from the extracted plurality of character string areas via the preview screen,
generating information relating to the scanned image by using character strings corresponding to the character string areas displayed in the selected state and/or character strings corresponding to character string areas selected by the user via the preview screen; and
storing, into the storage, selection information that indicates the character string areas that is used for generating the information relating to the scanned image.

* * * * *